(12) United States Patent
Uchiyama et al.

(10) Patent No.: US 12,240,338 B2
(45) Date of Patent: Mar. 4, 2025

(54) POWER SUPPLY SYSTEM INCLUDING AN ELECTRICAL MACHINE WITH ITS NEUTRAL POINT CONNECTED TO A POWER SUPPLY UNIT

(71) Applicant: DENSO CORPORATION, Kariya (JP)

(72) Inventors: Masaki Uchiyama, Kariya (JP); Daisuke Kuroda, Kariya (JP); Atsushi Fukaya, Kariya (JP); Keiya Tani, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/994,470

(22) Filed: Nov. 28, 2022

(65) Prior Publication Data
US 2023/0086550 A1    Mar. 23, 2023

Related U.S. Application Data

(63) Continuation of application No. PCT/JP2021/020154, filed on May 27, 2021.

(30) Foreign Application Priority Data

May 27, 2020 (JP) .................................. 2020-092690
May 26, 2021 (JP) .................................. 2021-088406

(51) Int. Cl.
*B60L 50/60* (2019.01)
*H01M 10/42* (2006.01)
(Continued)

(52) U.S. Cl.
CPC ........... *B60L 50/60* (2019.02); *H01M 10/425* (2013.01); *H01M 10/46* (2013.01);
(Continued)

(58) Field of Classification Search
CPC ........ H02J 7/0047; H02J 7/0063; B60L 50/60
See application file for complete search history.

(56) References Cited

U.S. PATENT DOCUMENTS 5,642,270 A * 6/1997 Green ..................... B60L 53/11
363/17
6,066,928 A * 5/2000 Kinoshita ............... B60L 50/40
180/65.8
(Continued)

FOREIGN PATENT DOCUMENTS

JP  2013-187919 A    9/2013
JP  2014087116 A *  5/2014 ............. Y02T 10/70
(Continued)

*Primary Examiner* — Adi Amrany
(74) *Attorney, Agent, or Firm* — Oliff PLC

(57) ABSTRACT

The present disclosure includes an inverter connected to a power supply unit via a positive electrode side electrical path and a negative electrode side electrical path and including switching elements, a rotary electric machine including windings connected to each other at a neutral point and inputting and outputting power from and to the power supply unit via the inverter, a connection path electrically connecting an intermediate point between the storage batteries of the power supply unit to the neutral point of the windings, and a device including a first terminal and a second terminal enabling energization between the power supply unit and the device. The first terminal is connected to the connection path, and the second terminal is connected to at least one of the positive electrode side electrical path and the negative electrode side electrical path.

9 Claims, 22 Drawing Sheets

(51) Int. Cl.

| | |
|---|---|
| *H01M 10/46* | (2006.01) |
| *H01M 10/48* | (2006.01) |
| *H01M 50/51* | (2021.01) |
| *H02J 7/00* | (2006.01) |
| *H02M 1/00* | (2006.01) |
| *H02M 1/08* | (2006.01) |
| *H02M 7/5387* | (2007.01) |
| *H02P 27/06* | (2006.01) |
| *H01M 10/0525* | (2010.01) |
| *H02J 7/34* | (2006.01) |

(52) U.S. Cl.
 CPC ......... *H01M 10/482* (2013.01); *H01M 50/51* (2021.01); *H02J 7/00032* (2020.01); *H02J 7/0013* (2013.01); *H02J 7/0047* (2013.01); *H02J 7/0063* (2013.01); *H02J 7/007182* (2020.01); *H02J 7/007188* (2020.01); *H02M 1/0009* (2021.05); *H02M 1/08* (2013.01); *H02M 7/53871* (2013.01); *H02P 27/06* (2013.01); *H01M 10/0525* (2013.01); *H01M 2220/20* (2013.01); *H02J 7/342* (2020.01); *H02J 2207/20* (2020.01)

(56) References Cited

U.S. PATENT DOCUMENTS

| | | | | |
|---|---|---|---|---|
| 11,772,505 | B2* | 10/2023 | Lee | H02J 7/1492 |
| | | | | 320/107 |
| 2005/0258796 | A1* | 11/2005 | Kusaka | B60L 50/40 |
| | | | | 318/801 |
| 2009/0250279 | A1* | 10/2009 | Holmes | B60L 50/51 |
| | | | | 180/65.285 |
| 2011/0011658 | A1 | 1/2011 | Takizawa | |
| 2011/0187301 | A1* | 8/2011 | Stancu | B60L 58/20 |
| | | | | 318/400.3 |
| 2017/0166068 | A1* | 6/2017 | Kim | H02P 5/74 |
| 2017/0259690 | A1* | 9/2017 | Koga | B60L 58/13 |
| 2018/0029473 | A1* | 2/2018 | Nishimura | B60L 3/04 |
| 2019/0165714 | A1* | 5/2019 | Nawa | H02P 6/14 |
| 2019/0173411 | A1* | 6/2019 | Jung | H02M 1/44 |
| 2020/0023746 | A1* | 1/2020 | Kim | B60L 53/14 |
| 2020/0162002 | A1* | 5/2020 | Taniguchi | H02K 21/16 |
| 2020/0341061 | A1* | 10/2020 | Shin | B60L 53/62 |
| 2021/0101494 | A1* | 4/2021 | Lee | H02M 1/44 |
| 2021/0336472 | A1* | 10/2021 | Bae | B60L 53/24 |
| 2021/0351684 | A1* | 11/2021 | Nishimura | H02M 3/158 |
| 2022/0231619 | A1* | 7/2022 | Iyasu | H02P 27/06 |
| 2023/0402870 | A1* | 12/2023 | Kamel | H02M 1/0043 |

FOREIGN PATENT DOCUMENTS

| | | |
|---|---|---|
| JP | 2018-114869 A | 7/2018 |
| WO | 2017/148602 A1 | 9/2017 |

* cited by examiner

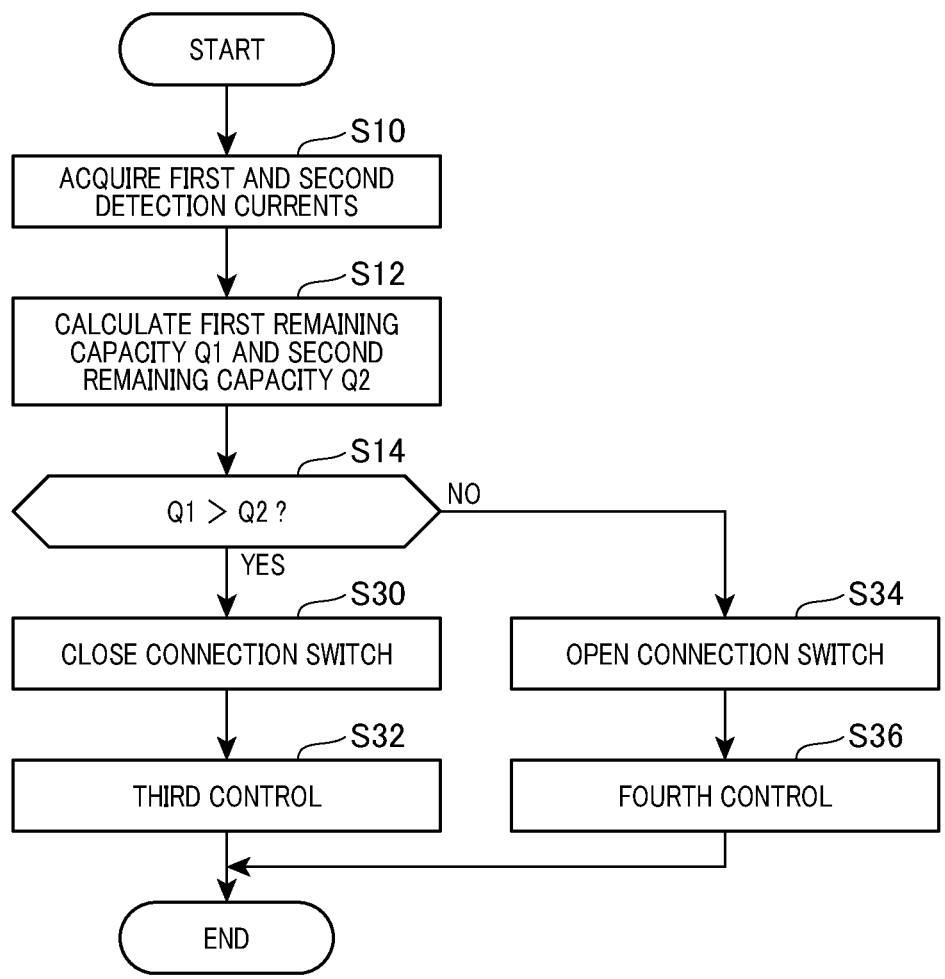

POWER SUPPLY SYSTEM INCLUDING AN ELECTRICAL MACHINE WITH ITS NEUTRAL POINT CONNECTED TO A POWER SUPPLY UNIT

CROSS-REFERENCE TO RELATED APPLICATION

The present application is a continuation application of International Application No. PCT/JP2021/020154, filed May 27, 2021, which claims priority to Japanese Patent Applications No. 2020-092690 filed May 27, 2020 and No. 2021-088406 filed May 26, 2021. The contents of these applications are incorporated herein by reference in their entirety.

BACKGROUND

Technical Field

The present disclosure relates to a power supply system including a power supply unit composed of a serial connection in which a plurality of storage batteries are connected in series.

Background Art

For example, recent vehicle power supply systems have been equipped with higher-voltage storage batteries, and a technique has been proposed in which a first storage battery and a second storage battery as several-hundred-volt storage batteries are connected in series to form a serial connection and power is supplied from the serial connection of the first storage battery and the second storage battery to a rotary electric machine during travel of the vehicle. This makes it possible to supply a large amount of power to the rotary electric machine.

SUMMARY

In the present disclosure, provided is a power supply system as the following.

The power supply system includes an inverter that is connected to a power supply unit via a positive electrode side electrical path and a negative electrode side electrical path and includes a plurality of switching elements; a rotary electric machine that includes a plurality of windings connected to each other at a neutral point and inputs and outputs power from and to the power supply unit via the inverter; a connection path that electrically connects an intermediate point between a plurality of storage batteries of the power supply unit to the neutral point of the windings; and a device that includes a first terminal and a second terminal that enable energization between the power supply unit and the device, wherein the first terminal of the device is connected to the connection path, and the second terminal of the device is connected to at least one of the positive electrode side electrical path and the negative electrode side electrical path.

BRIEF DESCRIPTION OF THE DRAWINGS

The above object and other objects, features, and advantages of the present disclosure will become more apparent from the following detailed description with reference to the accompanying drawings. In the drawings:

FIG. 7 is a flow chart showing a procedure of the auxiliary device driving process according to the first modification of the first embodiment;

DETAILED DESCRIPTION OF THE PREFERRED EMBODIMENTS

Figure 1:
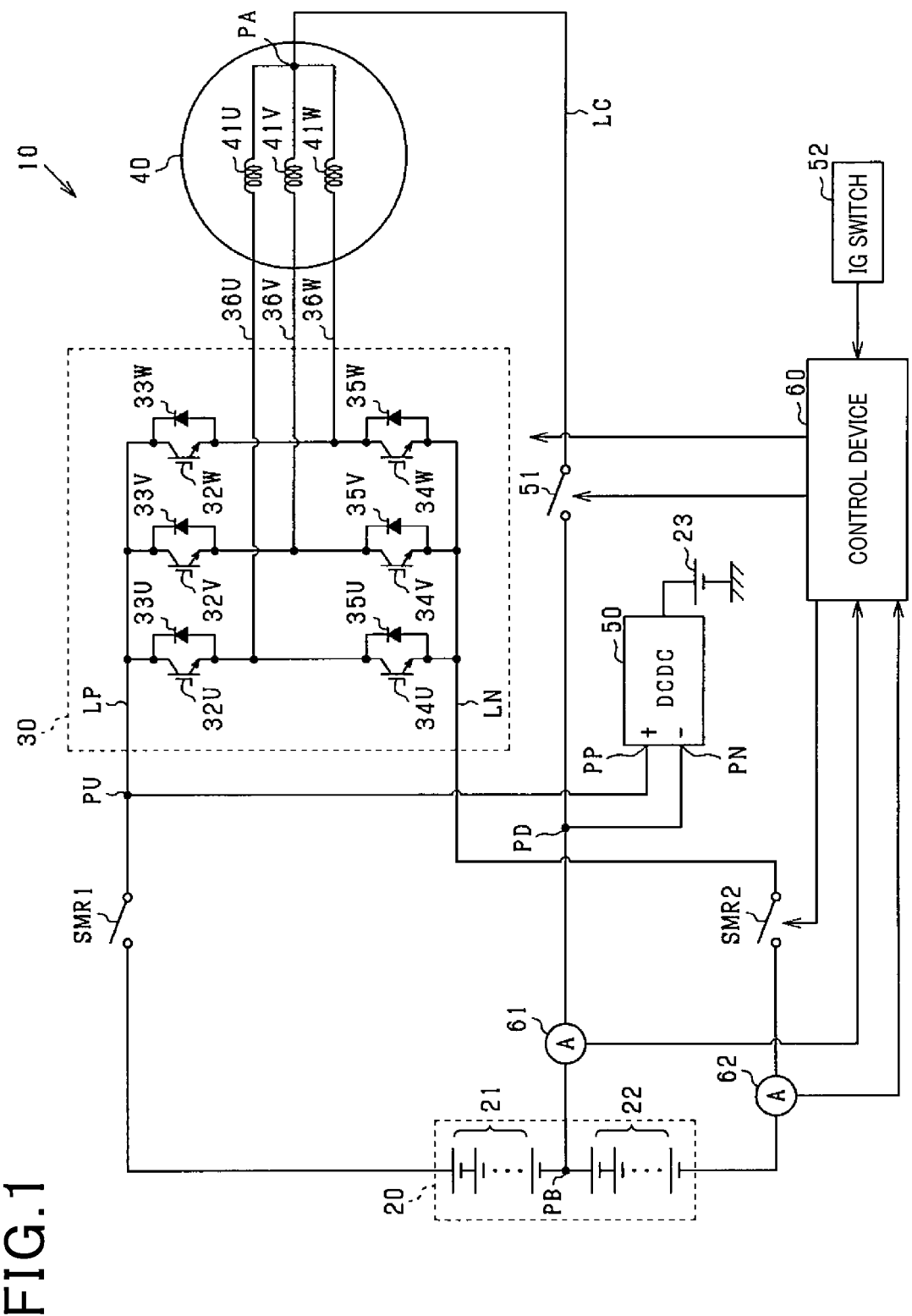
FIG. 1 is a general configuration diagram of a power supply system according to a first embodiment.

A technique is known in which a first storage battery and a second storage battery connected in series are individually discharged or charged. For example, a power supply system described in Patent Literature 1 includes a first division relay and a second division relay. In the first division relay, an input terminal is connected to each of a positive electrode side power line and an intermediate point between a first storage battery and a second storage battery, and an output terminal is connected to an auxiliary device load. In the second division relay, an input terminal is connected to each of a negative electrode side power line and the intermediate point between the first storage battery and the second storage battery, and an output terminal is connected to the auxiliary device load. By turning on only one of the first division relay and the second division relay, the first storage battery and the second storage battery can be individually discharged or charged.

[PTL 1] JP 2018-114869 A

In the power supply system described in Patent Literature 1, the division relays are provided for the respective storage batteries connected in series, and in each of the division relays, the input terminal on the positive side and the input terminal on the negative side connected to the storage batteries are opened or closed, causing the power supply system to have a complicated configuration.

The present disclosure has been made to solve the above problem, and an object of the present disclosure is to provide a power supply system that includes a plurality of storage batteries connected in series and appropriately performs energization in each of the storage batteries, while allowing the power supply system to have a simplified configuration.

A first means for solving the above problem is a power supply system including a power supply unit composed of a serial connection in which a plurality of storage batteries are connected in series, the power supply system including an inverter that is connected to the power supply unit via a positive electrode side electrical path and a negative electrode side electrical path and includes a plurality of switching elements, a rotary electric machine that includes a plurality of windings connected to each other at a neutral point and inputs and outputs power from and to the power supply unit via the inverter, a connection path that electrically connects an intermediate point between the storage batteries of the power supply unit to the neutral point of the windings, and a device that includes a first terminal and a second terminal that enable energization between the power supply unit and the device, wherein the first terminal of the device is connected to the connection path, and the second terminal of the device is connected to at least one of the positive electrode side electrical path and the negative electrode side electrical path.

The power supply system having the above configuration includes the power supply unit which is a serial connection in which a plurality of storage batteries are connected in series, and the power supply unit is charged and discharged. In the power supply system, the rotary electric machine is connected to the power supply unit via the inverter, and the rotary electric machine can input and output power from and to the power supply unit. The intermediate point between the storage batteries is electrically connected to the neutral point of the windings via the connection path, and the first terminal of the device is connected to the connection path. Furthermore, the second terminal of the device is connected to at least one of the positive electrode side electrical path and the negative electrode side electrical path of the power supply unit.

For example, in the case where the device is an auxiliary device to which power is supplied from the power supply unit as a power supply source, when the second terminal is connected to the positive electrode side electrical path, power is directly supplied to the auxiliary device via the positive electrode side electrical path and the connection path from a positive electrode side storage battery located at a position closer to a positive electrode than the neutral point is. Furthermore, the neutral point of the windings is connected to a positive electrode side of a negative electrode side storage battery located at a position closer to a negative electrode than the neutral point is, and switching control of the inverter causes the voltage on the positive electrode side of the negative electrode side storage battery to be stepped up in the windings of the rotary electric machine, and the stepped-up voltage is used to supply power to the auxiliary device. In this case, the power of the negative electrode side storage battery is supplied to the auxiliary device. When the second terminal is connected to the negative electrode side electrical path, power is directly supplied from the negative electrode side storage battery to the auxiliary device via the connection path and the negative electrode side electrical path. Furthermore, the neutral point of the windings is connected to a negative electrode side of the positive electrode side storage battery, and switching control of the inverter causes the voltage on the negative electrode side of the negative electrode side storage battery to be stepped down in the windings of the rotary electric machine, and the stepped-down voltage is used to supply power to the auxiliary device. In this case, the power of the negative electrode side storage battery is supplied to the auxiliary device.

In the case where the device is a charging device that charges the power supply unit as a charging target, when the second terminal is connected to the negative electrode side electrical path, the negative electrode side storage battery is directly charged by the charging device via the connection path and the negative electrode side electrical path. Furthermore, the neutral point of the windings is connected to the negative electrode side of the positive electrode side storage battery, and switching control of the inverter causes the charging voltage input to the charging device to be stepped up in the windings of the rotary electric machine, and the stepped-up voltage is used to charge the positive electrode side storage battery.

In these forms of energization, the connection state between the power supply unit and the device does not need to be switched depending on which of the positive electrode side storage battery and the negative electrode side storage battery of the power supply unit is used to perform energization. This enables the power supply system to appropriately perform energization in the storage batteries, while allowing the power supply system to have a simplified configuration.

In a second means, the power supply system includes a system main relay that is provided in at least one of a position in the positive electrode side electrical path closer to the power supply unit than a first connection point is and a position in the negative electrode side electrical path closer to the power supply unit than a second connection point is, the first connection point being a point at which the second terminal is connected to the positive electrode side electrical path, the second connection point being a point at which the second terminal is connected to the negative electrode side electrical path.

In the above configuration, for example, in the case where the second terminal is connected to the positive electrode side electrical path, by opening the system main relay, the energization between the positive electrode side storage battery and the device is stopped. Furthermore, by opening the system main relay, the step-up operation in the windings of the rotary electric machine is stopped, and the energization between the negative electrode side storage battery and the device is stopped. That is, the energization between each of the storage batteries and the device can be stopped using the system main relay.

In a third means, the power supply system includes a control device configured to perform inverter control by opening or closing the switching elements, wherein the power supply unit includes a first power storage unit on a positive electrode side that is comprised of at least one of the plurality of storage batteries and a second power storage unit on a negative electrode side that is comprised of the remaining one or more storage batteries, the connection path is connected to the intermediate point between the first power storage unit and the second power storage unit, the device is an auxiliary device to which power is supplied from the first power storage unit and the second power storage unit as power supply sources, the second terminal is connected to one of the positive electrode side electrical path and the negative electrode side electrical path, one of the first power storage unit and the second power storage unit to which the second terminal is connected via the positive electrode side electrical path or the negative electrode side electrical path is a specific power storage unit, and the other of the first power storage unit and the second power storage unit that is different from the specific power storage unit is a non-specific power storage unit, and the control device is configured to switch the inverter control between a first control in which the inverter control is performed so that no current flows through the connection path in response to supplying power from the specific power storage unit to the auxiliary device and a second control in which the inverter control is performed so that a predetermined current flows through the connection path in response to supplying power from the non-specific power storage unit to the auxiliary device.

In the first control in which the inverter is controlled so that no current flows through the connection path, no power is supplied from the non-specific battery to the auxiliary device via the connection path and the windings of the rotary electric machine. Thus, power is supplied from the specific power storage unit to the auxiliary device. On the other hand, in the second control in which the inverter is controlled so that a current flows through the connection path, power is supplied from the non-specific power storage unit to the auxiliary device via the connection path and the windings of the rotary electric machine. In the above configuration, the control is switched between the first control and the second control. This makes it possible to appropriately supply power from each of the power storage units without switching the connection state between the power supply unit and the device.

In a fourth means, the inverter includes a serial connection of an upper-arm switch and a lower-arm switch, the control device is configured to, in the first control, cause no current to flow through the connection path by adjusting a period in which the upper-arm switch is closed to be equal to a period in which the lower-arm switch is closed, and the control device is configured to, in the second control, cause a predetermined current to flow through the connection path by adjusting a period in which a specific switch is closed to be longer than a period in which a non-specific switch is closed, the specific switch being one of the upper-arm switch and the lower-arm switch to which the non-specific power storage unit is connected via the positive electrode side electrical path or the negative electrode side electrical path, the non-specific switch being the other of the upper-arm switch and the lower-arm switch that is different from the specific switch.

In the case where the intermediate point is electrically connected to the neutral point via the connection path, when the period in which the upper-arm switch is closed is equal to the period in which the lower-arm switch is closed, no current flows through the connection path, and when the period in which the upper-arm switch is closed is different from the period in which the lower-arm switch is closed, a current in a direction corresponding to the switch closed for a longer period flows through the connection path. In the above configuration, the period in which the upper-arm switch is closed and the period in which the lower-arm switch is closed are adjusted to control the current flowing through the connection path. This makes it possible to appropriately switch, using the inverter, the power storage unit from which power is supplied to the auxiliary device.

In a fifth means, the power supply system includes a plurality of current sensors that detect a current flowing through the first power storage unit and the second power storage unit, wherein the current sensors are provided at at least two of a first current detection point located at a position in the connection path closer to the power supply unit than a connection point of the connection path and the first terminal is, a second current detection point located at a position in an electrical path between the specific power storage unit and the inverter that is closer to the power supply unit than a connection point of the electrical path and the second terminal is, and a third current detection point located in an electrical path between the non-specific power storage unit and the inverter, and the control device is configured to switch the inverter control between the first control and the second control based on detection currents detected by the current sensors.

The power supply system includes the current sensors provided at least two of the first to third current detection points. Thus, charge/discharge currents flowing between the power storage units and the auxiliary device can be calculated based on the detection currents detected by the current sensors, and the remaining capacities of the power storage units can be calculated based on the charge/discharge currents. In the above configuration, the control is switched between the first control and the second control based on the detection currents detected by the current sensors. This makes it possible to equalize the remaining capacities of the power storage units.

In a sixth means, three or more of the storage batteries of the power supply unit are connected in series to have a plurality of the intermediate points between the storage batteries, the connection path is branched for each of the plurality of intermediate points and is selectively connectable to one of the plurality of intermediate points, and the control device is configured to acquire information on a driving voltage of the auxiliary device, and adjust an output voltage of the specific power storage unit by switching the one of the plurality of intermediate points connected to the connection path according to the driving voltage.

In the power supply system, the auxiliary device may be required to have different driving voltages. In this regard, in the above configuration, the output voltage of the specific power storage unit is adjusted by switching the intermediate point connected to the connection path according to the driving voltage of the auxiliary device. This makes it possible to set the output voltage of the specific power storage unit to be equal to or substantially equal to the driving voltage of the auxiliary device. In this case, the specific power storage unit and the non-specific power storage unit may have different output voltages; however, the output voltage of the non-specific power storage unit can be converted to a voltage equal to the driving voltage of the auxiliary device by controlling the inverter.

In a seventh means, the power supply system includes a switching unit configured to switch a connection state of the second terminal between a state in which the second terminal is connected to the positive electrode side electrical path and a state in which the second terminal is connected to the negative electrode side electrical path.

The specific power storage unit that directly supplies power to the auxiliary device may be different in power consumption speed from the non-specific power storage unit that supplies power to the auxiliary device via the windings of the rotary electric machine, resulting in a difference in the remaining capacities of the power storage units. In this regard, in the above configuration, the power storage unit connected to the second terminal is switchable between the first power storage unit and the second power storage unit. This makes it possible to equalize the remaining capacities of the power storage units.

In an eighth means, the power supply system includes a selection interruption device that is provided at a position in the connection path closer to the rotary electric machine than a connection point of the connection path and the first terminal is.

In the case where no power is supplied from the non-specific battery to the auxiliary device, and the intermediate point is electrically connected to the neutral point via the connection path, when a current temporarily flows through the connection path during power supply from the specific battery to the auxiliary device, the power of the specific battery is uselessly consumed. In this regard, in the above configuration, the selection interruption device is provided at a position in the connection path closer to the rotary electric machine than the connection point of the connection path and the first terminal is. Thus, in the case where no power is supplied from the non-specific battery to the auxiliary device, by causing the selection interruption device to be in an interruption state, power consumption of the specific battery can be reduced.

In a ninth means, the power supply system includes a power interruption device that is provided in at least one of a path connecting the first terminal to the connection path, a path connecting the second terminal to one of the positive electrode side electrical path and the negative electrode side electrical path, and a position in the connection path closer to the power supply unit than a connection point of the connection path and the first terminal is.

In the power supply system, in some cases, the power supply to the auxiliary device is desired to be stopped while the rotational movement of the rotary electric machine is continued. For example, in the case where a system main relay is used to stop the power supply to the auxiliary device, when the system main relay is opened, the rotational movement of the rotary electric machine is also stopped. In this regard, in the above configuration, the power interruption device is provided at least one of a path connecting the first terminal to the connection path, a path connecting the second terminal to one of the positive electrode side electrical path and the negative electrode side electrical path, and a position in the connection path closer to the power supply unit than the connection point of the connection path and the first terminal is. Thus, by causing the power interruption device to be in an interruption state, the power supply to the auxiliary device can be stopped while the rotational movement of the rotary electric machine is continued.

In a tenth means, the power supply system includes a control device configured to perform inverter control by opening or closing the switching elements, wherein the power supply unit includes a first power storage unit on a positive electrode side that is comprised of at least one of the plurality of storage batteries and a second power storage unit on a negative electrode side that is comprised of the remaining one or more storage batteries, the connection path is connected to the intermediate point between the first power storage unit and the second power storage unit, the device is a charging device that is connectable to a charging apparatus and to which charging power is input from the charging apparatus, the second terminal is connected to the negative electrode side electrical path, and the control device is configured to, during charging of the power supply unit, supply charging power from the charging device to the second power storage unit via the connection path and the negative electrode side electrical path to charge the second power storage unit, and step up a voltage on a positive electrode side of the second power storage unit by the inverter control and charge the first power storage unit using the voltage stepped up by the inverter control.

In the above configuration, the charging power from the charging device is supplied to the second power storage unit via the connection path and the negative electrode side electrical path to charge the second power storage unit. Furthermore, the voltage on the positive electrode side of the second power storage unit is stepped up by the inverter control, and the first power storage unit is charged with the stepped-up voltage. That is, by controlling the inverter, the first power storage unit can be simultaneously charged with charging of the second power storage unit. This makes it possible to charge the first power storage unit and the second power storage unit without switching the connection state between the power supply unit and the charging device, allowing the power supply system to have a simplified configuration.

In an eleventh means, the power supply system includes a power interruption device that is provided at a position in the connection path closer to the intermediate point than a connection point of the connection path and the first terminal is, wherein the second terminal is connected to each of the positive electrode side electrical path and the negative electrode side electrical path, the control device is configured to acquire information on a charging voltage of the charging apparatus, and during charging of the power supply unit, open the power interruption device in response to the charging voltage being a voltage corresponding to a total voltage of the power supply unit, and close the power interruption device in response to the charging voltage beings an intermediate voltage lower than the voltage corresponding to the total voltage of the power supply unit.

The charging voltage of the charging apparatus may not necessarily be the intermediate voltage of the total voltage of the power supply unit, that is, a voltage lower than the total voltage of the power supply unit, and may be a voltage corresponding to the total voltage of the power supply unit. When the charging voltage of the charging apparatus is a voltage corresponding to the total voltage of the power supply unit, and the charging voltage of the charging apparatus is applied to the second power storage unit via the connection path and the negative electrode side electrical path, a large current flows through the second power storage unit, and this may cause the second power storage unit to be overcharged.

In the above configuration, the power interruption device is provided at a position in the connection path closer to the intermediate point than the connection point of the connection path and the first terminal is. During charging of the power supply unit, the power interruption device is opened when the charging voltage of the charging apparatus is a voltage corresponding to the total voltage of the power supply unit, and the power interruption device is closed when the charging voltage of the charging apparatus is the intermediate voltage lower than the voltage corresponding to the total voltage of the power supply unit. This makes it possible to appropriately charge the first power storage unit and the second power storage unit according to the charging voltage of the charging apparatus.

In a twelfth means, three or more of the storage batteries of the power supply unit are connected in series to have a plurality of the intermediate points between the storage batteries, the connection path is branched for each of the plurality of intermediate points and is selectively connectable to one of the plurality of intermediate points, the control device is configured to acquire information on a charging voltage of the charging apparatus, and switch the one of the plurality of intermediate points connected to the connection path according to the charging voltage, and changes the voltage stepped up by the inverter control according to a switching position of the one of the plurality of intermediate points.

When the charging voltage of the charging apparatus is the intermediate voltage lower than the total voltage of the power supply unit, the intermediate voltage may be different each time. In such a case, when the charging voltage of the charging apparatus is different from the voltage on the positive electrode side of the second power storage unit, the power supply system is required to include a component that converts the charging voltage to the voltage on the positive electrode side of the second power storage unit. In the above configuration, the one of the intermediate points connected to the connection path is switched according to the charging voltage of the charging apparatus, and the voltage stepped up by the inverter control is changed according to the switching position of the one of the intermediate points. This enables the voltage on the positive electrode side of the second power storage unit to be equal to or substantially equal to the charging voltage. This eliminates the need for the power supply system to include a component that converts the charging voltage of the charging apparatus, separately from the inverter and the rotary electric machine, allowing the power supply system to have a simplified configuration.

In a thirteenth means, the inverter includes a serial connection of an upper-arm switch and a lower-arm switch, and the control device is configured to, in the inverter control during charging of the power supply unit, adjust a period in which the upper-arm switch is opened to be longer than a period in which the lower-arm switch is opened, and adjust the period in which the upper-arm switch is opened to be longer as the charging voltage is lower.

In the case where the intermediate point is electrically connected to the neutral point via the connection path, the charging voltage is stepped up by adjusting the period in which the upper-arm switch is opened to be longer than the period in which the lower-arm switch is opened. Furthermore, as the upper-arm switch is opened for a longer period, the charging voltage is stepped up by a larger amount. In the above configuration, the period in which the upper-arm switch is opened is adjusted according to the charging voltage of the charging apparatus to adjust the amount by which the charging voltage is stepped up. This makes it possible to appropriately charge the first power storage unit using the inverter.

First Embodiment

An embodiment of a power supply system according to the present disclosure as a power supply system 10 to be mounted on a vehicle will be described below with reference to the drawings.

As shown in FIG. 1, the power supply system 10 is a system that supplies power to a rotary electric machine 40 and a DCDC converter (hereinafter referred to as converter) 50 as a device. As shown in FIG. 1, the power supply system 10 includes a battery pack 20 as a power supply unit, an inverter 30, the rotary electric machine 40, the converter 50, and a control device 60.

The rotary electric machine 40 is a three-phase synchronous machine, and includes a U-phase winding 41U, a V-phase winding 41V, and a W-phase winding 41W that are star-connected as a stator winding. The rotary electric machine 40 is, for example, a permanent magnet synchronous machine. In the present embodiment, the rotary electric machine 40 is an vehicle-mounted main machine, and serves as a travel power source of the vehicle.

The inverter 30 includes a serial connection of an upper-arm switch 32 (32U, 32V, 32W) and a lower-arm switch 34 (34U, 34V, 34W) for three phases. In the present embodiment, the switches 32 and 34 are each a voltage-control semiconductor switching element, specifically, an IGBT. Thus, in each of the switches 32 and 34, a high-potential side terminal is a collector, and a low-potential side terminal is an emitter. The switch 32 is connected in antiparallel to an upper-arm diode 33 (33U, 33V, 33W) as a free wheel diode, and the switch 34 is connected in antiparallel to a lower-arm diode 35 (35U, 35V, 35W) as a free wheel diode.

The emitter of the U-phase upper-arm switch 32U and the collector of the U-phase lower-arm switch 34U are connected to a first end of the U-phase winding 41U via a U-phase conductive member 36U such as a bus bar. The emitter of the V-phase upper-arm switch 32V and the collector of the V-phase lower-arm switch 34V are connected to a first end of the V-phase winding 41V via a V-phase conductive member 36V such as a bus bar. The emitter of the W-phase upper-arm switch 32W and the collector of the W-phase lower-arm switch 34W are connected to a first end of the W-phase winding 41W via a W-phase conductive member 36W such as a bus bar. Second ends of the U-phase winding 41U, the V-phase winding 41V, and the W-phase winding 41W are connected to each other at a neutral point PA.

The collectors of the upper-arm switches 32U, 32V, and 32W are connected to a positive electrode terminal of the battery pack 20 via a positive electrode side electrical path LP, and the emitters of the lower-arm switches 34U, 34V, and 34W are connected to a negative electrode terminal of the battery pack 20 via a negative electrode side electrical path LN. The rotary electric machine 40 is connected to the battery pack 20 via the positive electrode side electrical path LP, the negative electrode side electrical path LN, and the inverter 30, and inputs and outputs power from and to the battery pack 20.

The battery pack 20 is configured as a serial connection of battery cells each of which is a single cell, and has a terminal voltage of, for example, several hundred volts. In the present embodiment, the terminal voltages (e.g., rated voltages) of the battery cells constituting the battery pack 20 are set to be equal to each other. The battery cells may be, for example, secondary batteries such as lithium-ion batteries.

In the present embodiment, a serial connection of two or more of the battery cells constituting the battery pack 20 on the high-potential side constitutes a first power storage unit 21, and a serial connection of the remaining two or more battery cells on the low-potential side constitutes a second power storage unit 22. That is, the battery pack 20 is divided into two blocks to form the first power storage unit 21, and the second power storage unit 22 connected in series to a negative electrode side of the first power storage unit 21. In the present embodiment, the number of battery cells constituting the first power storage unit 21 is equal to the number of battery cells constituting the second power storage unit 22, and the terminal voltage of the first power storage unit 21 is equal to the terminal voltage of the second power storage unit 22. The number of battery cells constituting the first power storage unit 21 may be different from the number of battery cells constituting the second power storage unit 22, and the terminal voltage of the first power storage unit 21 may be different from the terminal voltage of the second power storage unit 22. In the present embodiment, the first power storage unit 21 and the second power storage unit 22 correspond to a "plurality of storage batteries".

In the battery pack 20, an intermediate terminal PB is provided at an intermediate point between a negative electrode terminal of the first power storage unit 21 and a positive electrode terminal of the second power storage unit 22. In the present embodiment, the intermediate terminal PB is connected to the neutral point PA of the rotary electric machine 40 via a connection path LC.

The converter 50 uses the first power storage unit 21 and the second power storage unit 22 as power supply sources, converts (steps down) the terminal voltage of each of the first power storage unit 21 and the second power storage unit 22, and supplies the converted voltage to a low-voltage storage battery 23. The low-voltage storage battery 23 is, for example, a lead storage battery having a rated voltage of 12 V.

The converter 50 includes a high-voltage side input terminal PP and a low-voltage side input terminal PN as input terminals for receiving power supply. In the present embodiment, the high-voltage side input terminal PP is connected to the positive electrode side electrical path LP at a high-voltage side connection point PU, and the low-voltage side input terminal PN is connected to the connection path LC at a low-voltage side connection point PD. That is, the high-voltage side input terminal PP is connected to the first power storage unit 21 side of the battery pack 20. In the present embodiment, the low-voltage side input terminal PN corresponds to a "first terminal", the high-voltage side input terminal PP corresponds to a "second terminal", the first power storage unit 21 corresponds to a "specific power storage unit", and the second power storage unit 22 corresponds to a "non-specific power storage unit".

The power supply system 10 includes a first system main relay switch (hereinafter referred to as relay switch) SMR1, a second relay switch SMR2, a connection switch 51 as a selection interruption device, a first current sensor 61, and a second current sensor 62. The first relay switch SMR1 is provided at a position in the positive electrode side electrical path LP closer to the battery pack 20 than the high-voltage side connection point PU is, and the second relay switch SMR2 is provided in the negative electrode side electrical path LN. The first relay switch SMR1 and the second relay switch SMR2 allow energization between the battery pack 20 and the rotary electric machine 40 to be switched between an energization state and an interruption state.

The connection switch 51 is a relay switch that is provided at a position in the connection path LC closer to the rotary electric machine 40 than the low-voltage side connection point PD is. The connection switch 51 allows the energization between each of the first power storage unit 21 and the second power storage unit 22 and the rotary electric machine 40 to be switched between the energization state and the interruption state, while ensuring energization between each of the first power storage unit 21 and the second power storage unit 22 and the converter 50.

The first current sensor 61 is provided at a position in the connection path LC closer to the battery pack 20 than the low-voltage side connection point PD is, and the second current sensor 62 is provided in the negative electrode side electrical path LN. The first current sensor 61 detects the magnitude and direction of a current flowing through a point at which the sensor 61 is provided, and the second current sensor 62 detects the magnitude and direction of a current flowing through a point at which the sensor 62 is provided. A first detection current ID1 detected by the first current sensor 61 and a second detection current ID2 detected by the second current sensor 62 are input to the control device 60. In the present embodiment, the point at which the first current sensor 61 is provided corresponds to a "first current detection point", and the point at which the second current sensor 62 is provided corresponds to a "third current detection point".

The control device 60 is mainly composed of a microcomputer, and executes a program stored in a storage device of the control device 60 to implement various control functions. The control device 60 controls the open/closed state of the first relay switch SMR1, the second relay switch SMR2, and the connection switch 51. Furthermore, the control device 60 is connected to an IG switch 52 of the vehicle, and monitors the open/closed state of the IG switch 52. The IG switch 52 is a start switch of the vehicle.

The control device 60 performs switching control of the inverter 30 (inverter control) by controlling the open/closed state of the switches 32 and 34 constituting the inverter 30, in order to perform feedback control for controlling the value of a controlled variable of the rotary electric machine 40 to be a command value. The controlled variable is, for example, a torque. In each phase, the upper-arm switch 32 and the lower-arm switch 34 are alternately closed.

In the switching control of the inverter 30, the control device 60 performs an auxiliary device driving process based on the first detection current ID1 detected by the first current sensor 61 and the second detection current ID2 detected by the second current sensor 62. The auxiliary device driving process is a process for equalizing the remaining capacities of the first power storage unit 21 and the second power storage unit 22.

Figure 2:
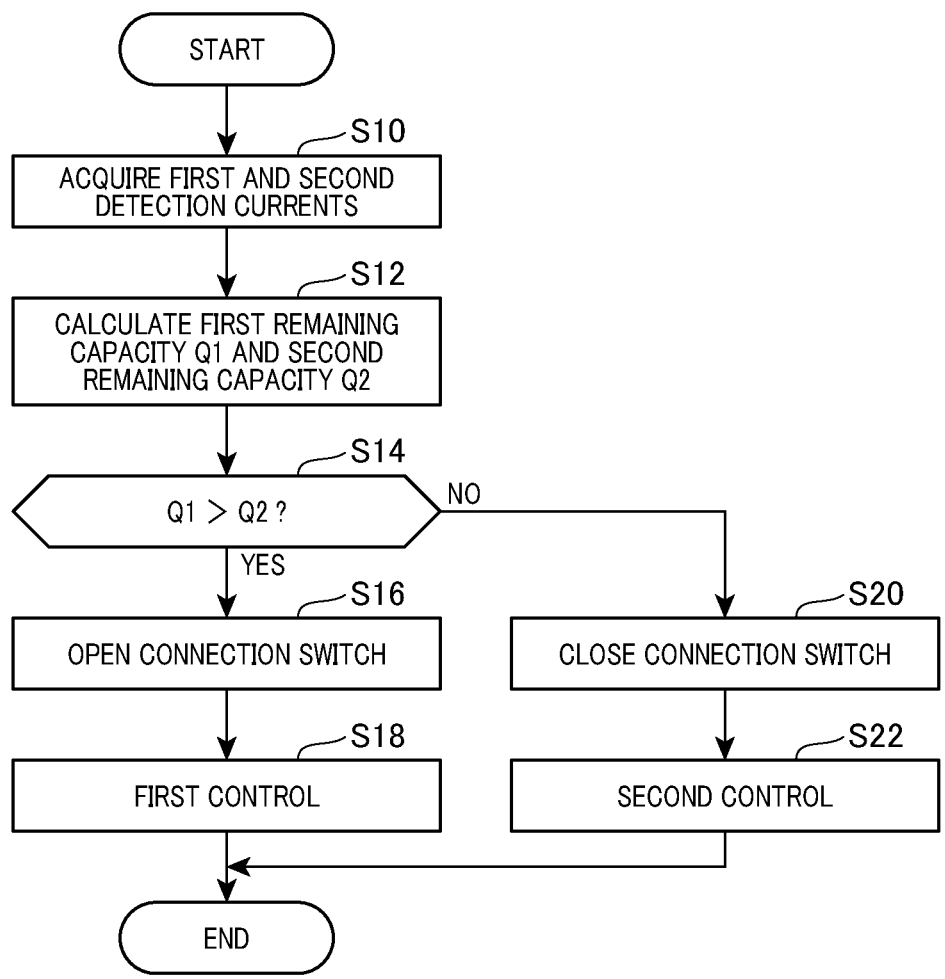
FIG. 2 is a flow chart showing a procedure of an auxiliary device driving process according to the first embodiment.

FIG. 2 shows a flow chart of the auxiliary device driving process of the present embodiment. When the IG switch 52 is closed, the control device 60 repeatedly performs the auxiliary device driving process for each predetermined control period.

When the auxiliary device driving process is started, first, in step S10, the first detection current ID1 and the second detection current ID2 are acquired from the first current sensor 61 and the second current sensor 62. In subsequent step S12, the remaining capacities of the first power storage unit 21 and the second power storage unit 22 are calculated. The remaining capacities of the first power storage unit 21 and the second power storage unit 22 are state of charges (SOCs) indicating the power storage capacities of the power storage units 21 and 22. When the first power storage unit 21 and the second power storage unit 22 are in an energization state (a charge state or a discharge state), the remaining capacities of the first power storage unit 21 and the second power storage unit 22 are calculated using current integrated values which are time integration values of charge/discharge currents of the first power storage unit 21 and the second power storage unit 22.

For example, in the case where the first power storage unit 21 and the second power storage unit 22 are in the discharge state, when the first detection current ID1 flowing through the connection path LC flows in a direction from the rotary electric machine 40 toward the battery pack 20, the discharge current of the first power storage unit 21 is an addition value obtained by adding the first detection current ID1 to the second detection current ID2, and the discharge current of the second power storage unit 22 is the second detection current ID2. Furthermore, for example, in the case where the first power storage unit 21 and the second power storage unit 22 are in the discharge state, when the first detection current ID1 flowing through the connection path LC flows in a direction from the battery pack 20 toward the rotary electric machine 40, the discharge current of the first power storage unit 21 is a subtraction value obtained by subtracting the first detection current ID1 from the second detection current ID2, and the discharge current of the second power storage unit 22 is the second detection current ID2. In step S12, time integration of the charge/discharge current of the first power storage unit 21 is performed to calculate a first remaining capacity Q1 of the first power storage unit 21, and time integration of the charge/discharge current of the second power storage unit 22 is performed to calculate a second remaining capacity Q2 of the second power storage unit 22.

In step S14, it is determined whether the first remaining capacity Q1 is larger than the second remaining capacity Q2. When an affirmative determination is made in step S14, in step S16, the connection switch 51 is opened. In subsequent step S18, a first control is performed in which switching control of the switches 32 and 34 is performed so that power is supplied from the first power storage unit 21 to the converter 50, and the auxiliary device driving process ends.

On the other hand, when a negative determination is made in step S14, in step S20, the connection switch 51 is closed. In subsequent step S22, a second control is performed in which switching control of the switches 32 and 34 is performed so that power is supplied from the second power storage unit 22 to the converter 50, and the auxiliary device driving process ends. The auxiliary device driving process shown in FIG. 2 may be performed on condition that power supply to the converter 50 as an auxiliary device is requested.

The first control and the second control in the auxiliary device driving process will be described below.

Figure 3A:
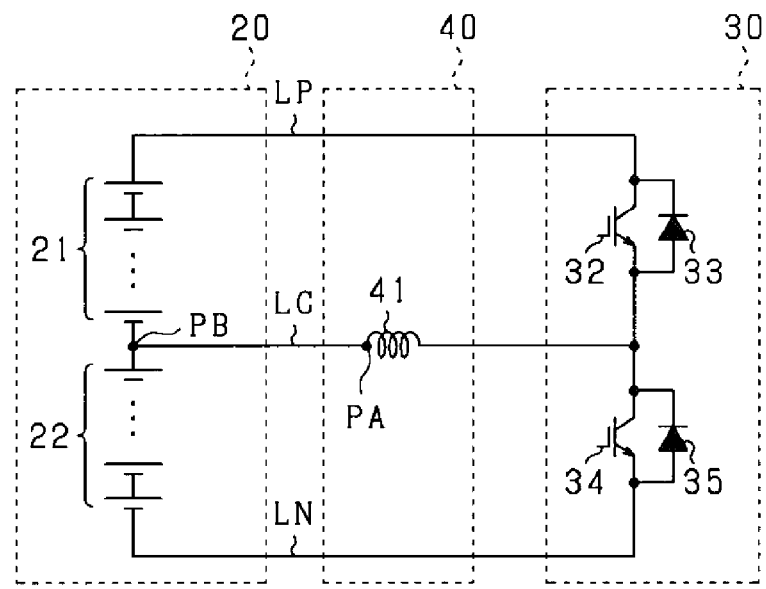
FIG. 3A and FIG. 3B are diagrams showing an equivalent circuit of the power supply system.

FIG. 3A shows an equivalent circuit of the power supply system 10 used in equalization control. In FIG. 3A, the winding 41 indicates the phase windings 41U to 41W, the upper-arm switch 32 indicates the upper-arm switches 32U, 32V, and 32W, and the upper-arm diode 33 indicates the upper-arm diodes 33U, 33V, and 33W. Furthermore, the lower-arm switch 34 indicates the lower-arm switches 34U, 34V, and 34W, and the lower-arm diode 35 indicates the lower-arm diodes 35U, 35V, and 35W.

Figure 3B:
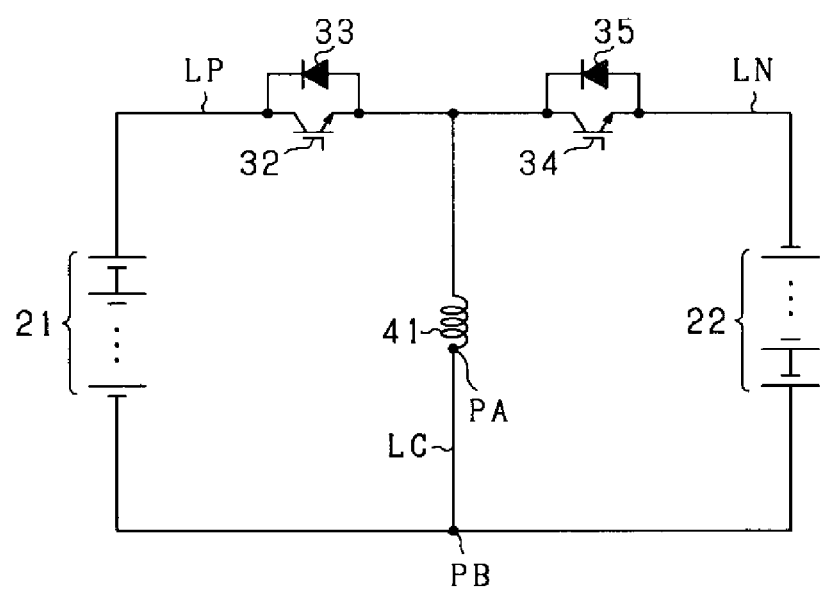

The equivalent circuit in FIG. 3A can be shown as a circuit in FIG. 3B. The circuit in FIG. 3B is a step-up/step-down chopper circuit in which power can be bidirectionally transmitted between the first power storage unit 21 and the second power storage unit 22.

Figure 4A:
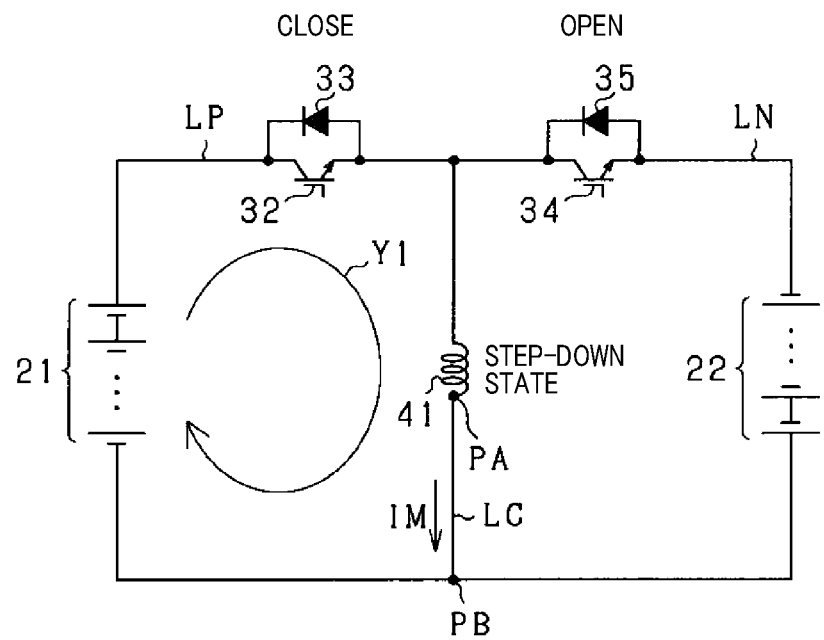
FIG. 4A and FIG. 4B are diagrams showing a current flowing through a connection path.

In the case where the intermediate terminal PB is connected to the neutral point PA via the connection path LC, as shown in FIG. 4A, when the upper-arm switch 32 is closed and the lower-arm switch 34 is opened, due to the power of the first power storage unit 21, a current flows through a closed circuit including the first power storage unit 21 and the winding 41 (see arrow Y1). Thus, an excitation current flows through the winding 41 in a positive direction which is a direction toward the neutral point PA, and a current IM flows through the connection path LC in a direction from the neutral point PA toward the intermediate terminal PB.

Figure 4B:
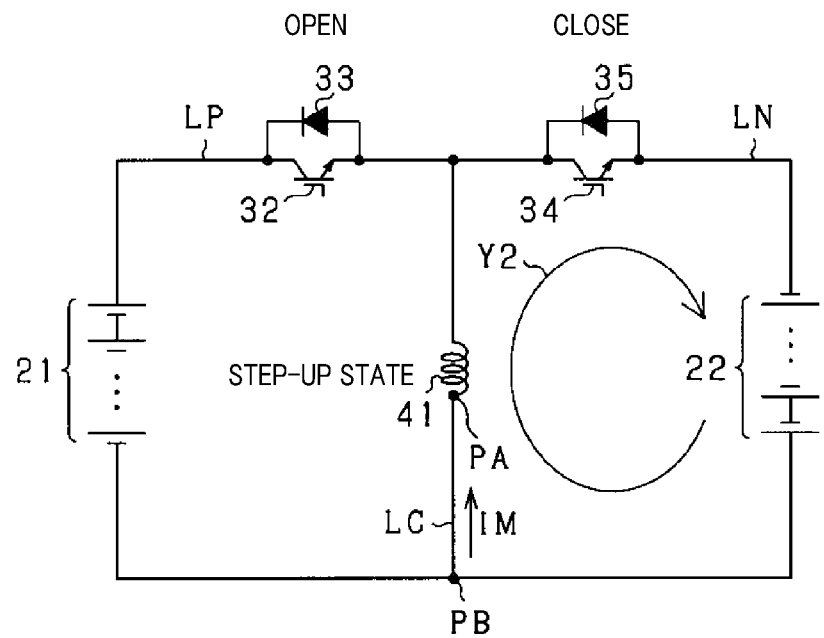

On the other hand, as shown in FIG. 4B, when the upper-arm switch 32 is opened and the lower-arm switch 34 is closed, due to the power of the second power storage unit 22, a current flows through a closed circuit including the second power storage unit 22 and the winding 41 (see arrow Y2). Thus, an excitation current flows through the winding 41 in a negative direction opposite to the positive direction, and a current IM flows through the connection path LC in a direction from the intermediate terminal PB toward the neutral point PA.

That is, in the case where the intermediate terminal PB is connected to the neutral point PA via the connection path LC, by closing the upper-arm switch 32, the current IM toward the intermediate terminal PB flows through the connection path LC. Furthermore, the excitation current in the positive direction flows through the winding 41, leading to a step-down state in which the voltage on the neutral point PA side is lower than the voltage on the side of the switches 32 and 34. By closing the lower-arm switch 34, the current IM toward the neutral point PA flows through the connection path LC. Furthermore, the excitation current in the negative direction flows through the winding 41, leading to a step-up state in which the voltage on the side of the switches 32 and 34 is higher than the voltage on the neutral point PA side.

In the present embodiment, the second control is performed so that the current IM toward the neutral point PA flows through the connection path LC to supply power from the second power storage unit 22 to the converter 50. Specifically, switching control of the switches 32 and 34 is performed so that a period in which the lower-arm switch 34 is closed (on-time of the lower-arm switch 34) is longer than a period in which the upper-arm switch 32 is closed (on-time of the upper-arm switch 32), while the upper-arm switch 32 and the lower-arm switch 34 are alternately closed. In the present embodiment, the upper-arm switch 32 corresponds to a "non-specific switch", and the lower-arm switch 34 corresponds to a "specific switch".

Figure 5A:
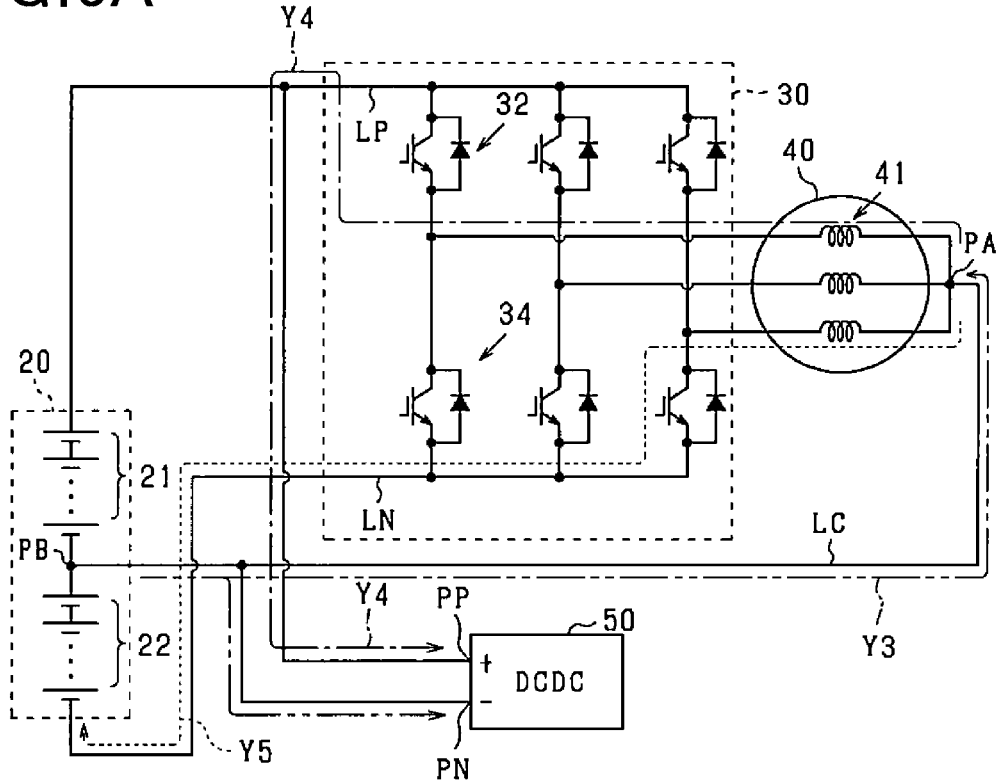
FIG. 5A and FIG. 5B are diagrams showing a current flowing through the power supply system.

A relationship between the flow of current IM toward the neutral point PA through the connection path LC and the supply of power from the second power storage unit 22 to the converter 50 will be specifically described with reference to FIG. 5A. In FIG. 5A, the low-voltage storage battery 23, the first relay switch SMR1, the second relay switch SMR2, the connection switch 51, the IG switch 52, the first current sensor 61, the second current sensor 62, and the control device 70 are not shown. The same applies to FIG. 5B, FIG. 8A, and FIG. 8B.

As shown in FIG. 5A, when the current IM toward the neutral point PA flows through the connection path LC (see arrow Y3), the voltage can be stepped up in the winding 41. In this case, when the winding 41 is in a step-up state due to switching control of the switches 32 and 34, the voltage on the side of the switches 32 and 34 of the winding 41 is higher than the voltage on the neutral point PA side. That is, the voltage of the positive electrode side electrical path LP connected to the side of the switches 32 and 34 of the winding 41 via the upper-arm switch 32 is higher than the voltage on the positive electrode side of the second power storage unit 22 connected to the neutral point PA via the connection path LC. The voltage of the positive electrode side electrical path LP is input to the high-voltage side input terminal PP of the converter 50, and the voltage on the positive electrode side of the second power storage unit 22 is input to the low-voltage side input terminal PN of the converter 50. Thus, power is supplied from the second power storage unit 22 to the converter 50 (see arrow Y4). Furthermore, part of the current IM flowing to the neutral point PA flows to the negative electrode of the second power storage unit 22 via the lower-arm switch 34 (see arrow Y5).

That is, when the current flows back between the second power storage unit 22 and the winding 41 (see arrows Y3 and Y5), power is supplied from the second power storage unit 22 to the converter 50 (see arrow Y4).

Furthermore, the first control is performed so that no current IM flows through the connection path LC to supply power from the first power storage unit 21 to the converter 50. Specifically, switching control of the switches 32 and 34 is performed so that the period in which the lower-arm switch 34 is closed is equal to the period in which the upper-arm switch 32 is closed, while the upper-arm switch 32 and the lower-arm switch 34 are alternately closed.

Figure 5B:
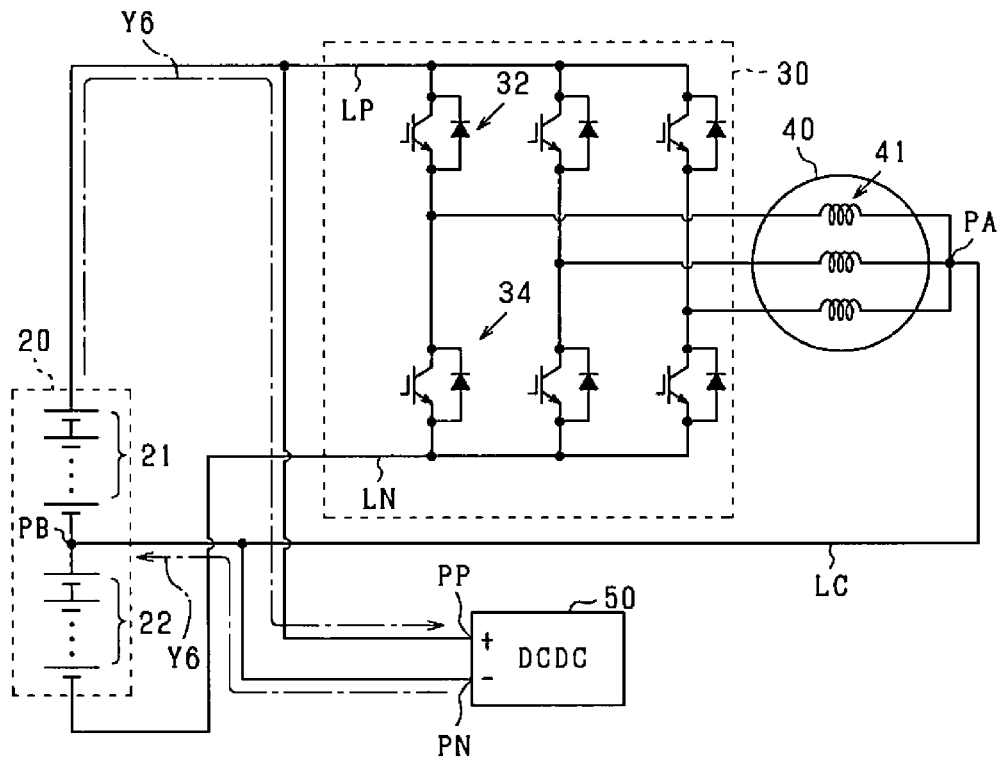

As shown in FIG. 5B, when no current IM flows through the connection path LC, the voltage cannot be stepped up or stepped down in the winding 41, and no power is supplied from the second power storage unit 22 to the converter 50 even when the intermediate terminal PB is connected to the neutral point PA via the connection path LC. Thus, power is directly supplied from the first power storage unit 21 to the converter 50 via the positive electrode side electrical path LP and the connection path LC (see arrow Y6).

In the auxiliary device driving process of the present embodiment, depending on whether the first remaining capacity Q1 is larger than the second remaining capacity Q2, the control is switched between the first control and the second control to switch one of the power storage units 21 and 22 from which power is supplied to the converter 50. This makes it possible to supply power to the converter 50 from one of the power storage units 21 and 22 that has a larger remaining capacity, equalizing the remaining capacity Q1 of the first power storage unit 21 and the remaining capacity Q2 of the second power storage unit 22.

The present embodiment described above in detail provides the following effects.

In the present embodiment, the intermediate terminal PB between the first power storage unit 21 and the second power storage unit 22 is electrically connected to the neutral point PA of the winding 41 via the connection path LC. The converter 50 includes the high-voltage side input terminal PP and the low-voltage side input terminal PN for receiving power supply, and the high-voltage side input terminal PP is connected to the positive electrode side electrical path LP and the low-voltage side input terminal PN is connected to the connection path LC. In this configuration, power is directly supplied from the first power storage unit 21 to the converter 50 via the positive electrode side electrical path LP and the connection path LC. Furthermore, the positive electrode side of the second power storage unit 22 is connected to the neutral point PA of the winding 41, and switching control of the inverter 30 causes the voltage on the positive electrode side of the second power storage unit 22 to be stepped up in the winding 41 of the rotary electric machine 40, and power is supplied to the converter 50. In this case, the power of the second power storage unit 22 is supplied to the converter 50.

In both of these power supplies, since the intermediate terminal PB between the first power storage unit 21 and the second power storage unit 22 is connected to the low-voltage side input terminal PN of the converter 50, the connection state between the battery pack 20 and the converter 50 does not need to be switched. This eliminates the need for a switch for switching the connection state between the battery pack 20 and the converter 50. This makes it possible to supply power from the power storage units 21 and 22 to the converter 50, while allowing the power supply system 10 to have a simplified configuration.

In the present embodiment, in the positive electrode side electrical path LP to which the high-voltage side input terminal PP is connected, the first relay switch SMR1 is provided at a position closer to the battery pack 20 than the high-voltage side connection point PU is. In this configuration, by opening the first relay switch SMR1, the power supply from the first power storage unit 21 to the converter 50 is stopped. Furthermore, by opening the first relay switch SMR1, the step-up operation in the winding 41 of the rotary electric machine 40 is stopped, and the power supply from the second power storage unit 22 to the converter 50 is stopped. That is, the power supply from the power storage units 21 and 22 to the converter 50 can be stopped using the first relay switch SMR1.

In the first control in which the inverter 30 is controlled so that no current IM flows through the connection path LC, no power is supplied from the second power storage unit 22 to the converter 50 via the connection path LC and the winding 41 of the rotary electric machine 40. Thus, power is supplied from the first power storage unit 21 to the converter 50. On the other hand, in the second control in which the inverter 30 is controlled so that the current IM flows through the connection path LC, power is supplied from the second power storage unit 22 to the converter 50 via the connection path LC and the winding 41 of the rotary electric machine 40. In the present embodiment, the control is switched between the first control and the second control. This makes it possible to appropriately supply power from each of the power storage units 21 and 22 without switching the connection state between the battery pack 20 and the converter 50.

In the case where the intermediate terminal PB is electrically connected to the neutral point PA via the connection path LC, when the period in which the upper-arm switch 32 is closed is equal to the period in which the lower-arm switch 34 is closed, no current IM flows through the connection path LC, and when the period in which the upper-arm switch 32 is closed is different from the period in which the lower-arm switch 34 is closed, the current IM in a direction corresponding to the switch closed for a longer period flows through the connection path. In the present embodiment, the period in which the upper-arm switch 32 is closed and the period in which the lower-arm switch 34 is closed are adjusted to control the current IM flowing through the connection path LC. This makes it possible to appropriately switch, using the inverter 30, one of the power storage units 21 and 22 from which power is supplied to the converter 50.

The power supply system 10 includes the first current sensor 61 and the second current sensor 62. Thus, the charge/discharge currents flowing between the power storage units 21 and 22 and the converter 50 can be calculated based on the detection current ID1 detected by the current sensor 61 and the detection current ID2 detected by the current sensor 62, and the remaining capacity Q1 of the power storage unit 21 and the remaining capacity Q2 of the power storage unit 22 can be calculated based on the charge/discharge currents. In the present embodiment, the control is switched between the first control and the second control based on the detection current ID1 detected by the first current sensor 61 and the detection current ID2 detected by the second current sensor 62. This makes it possible to equalize the remaining capacity Q1 of the power storage unit 21 and the remaining capacity Q2 of the power storage unit 22.

In the first control in which no power is supplied from the second power storage unit 22 to the converter 50, in the case where the intermediate terminal PB is electrically connected to the neutral point PA via the connection path LC, when the current IM temporarily flows through the connection path LC during power supply from the first power storage unit 21 to the converter 50, the power of the first power storage unit 21 is uselessly consumed. In this regard, in the present embodiment, the connection switch 51 is provided at a position in the connection path LC closer to the rotary electric machine 40 than the low-voltage side connection point PD is. Thus, in the first control in which no power is supplied from the second power storage unit 22 to the converter 50, by opening the connection switch 51, power consumption of the first power storage unit 21 can be reduced.

(First Modification of First Embodiment)

Figure 6:
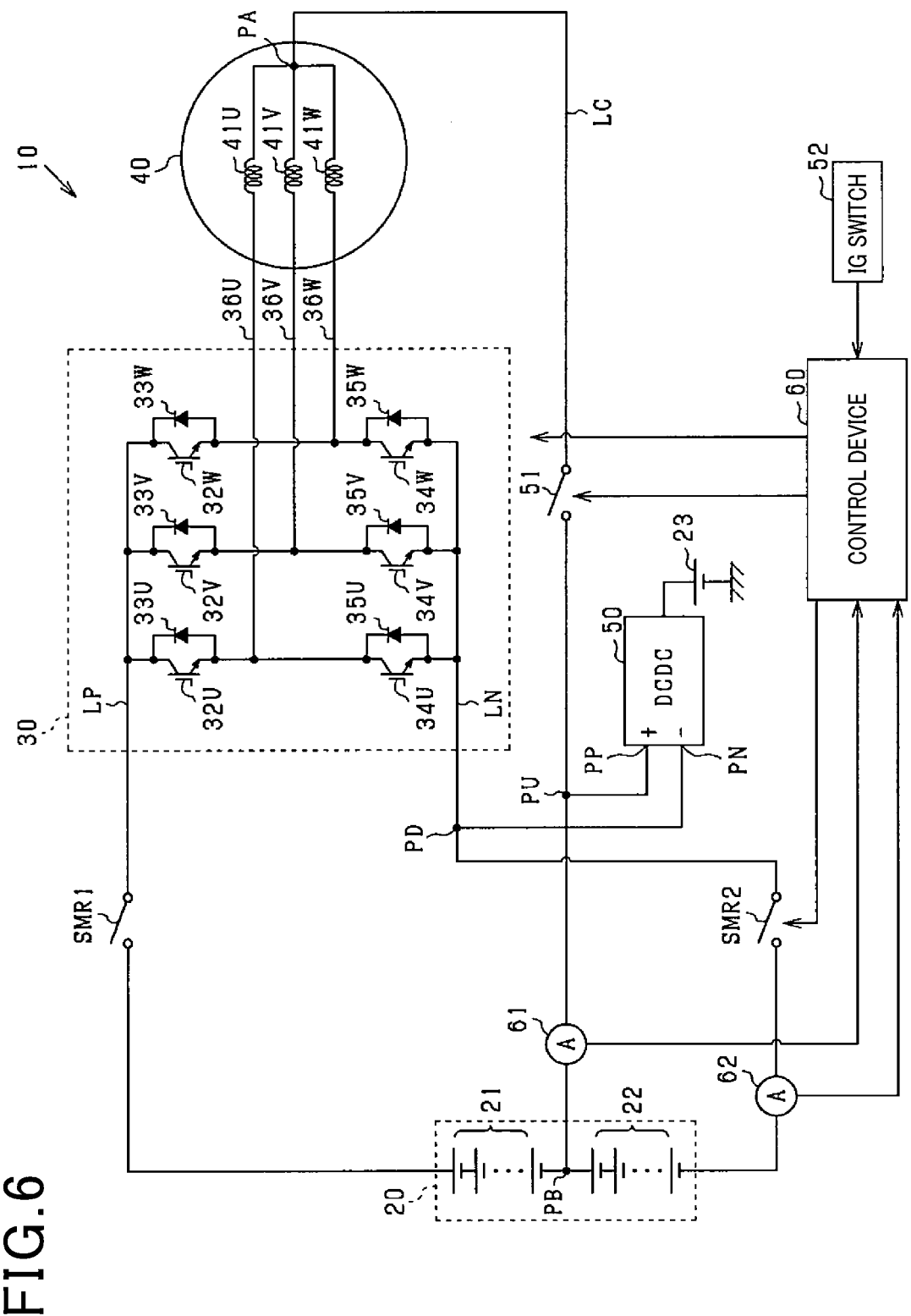
FIG. 6 is a general configuration diagram of a power supply system according to a first modification of the first embodiment.

As shown in FIG. 6, the converter 50 may be configured such that the high-voltage side input terminal PP is connected to the connection path LC at the high-voltage side connection point PU and that the low-voltage side input terminal PN is connected to the negative electrode side electrical path LN at the low-voltage side connection point PD. That is, the low-voltage side input terminal PN may be connected to the second power storage unit 22 side of the battery pack 20. In the present modification, the high-voltage side input terminal PP corresponds to the "first terminal", the low-voltage side input terminal PN corresponds to the "second terminal", the second power storage unit 22 corresponds to the "specific power storage unit", and the first power storage unit 21 corresponds to the "non-specific power storage unit".

The second relay switch SMR2 is provided at a position in the negative electrode side electrical path LN closer to the battery pack 20 than the low-voltage side connection point PD is. The connection switch 51 is provided at a position in the connection path LC closer to the rotary electric machine 40 than the high-voltage side connection point PU is. The first current sensor 61 is provided at a position in the connection path LC closer to the battery pack 20 than the high-voltage side connection point PU is. The second current sensor 62 is provided at a position in the negative electrode side electrical path LN closer to the battery pack 20 than the low-voltage side connection point PD is, and the second current sensor 62 detects the magnitude and direction of a current flowing through a point at which the second current sensor 62 is provided. In the present modification, the point at which the second current sensor 62 is provided corresponds to a "second current detection point".

FIG. 7 shows a flow chart of the auxiliary device driving process of the present modification. In FIG. 7, the same steps as the steps shown in FIG. 2 are denoted by the same step numbers and the description thereof is omitted.

In the auxiliary device driving process of the present modification, when an affirmative determination is made in step S14, in step S30, the connection switch 51 is closed. In subsequent step S32, a third control is performed in which switching control of the switches 32 and 34 is performed so that power is supplied from the first power storage unit 21 to the converter 50, and the auxiliary device driving process ends.

On the other hand, when a negative determination is made in step S14, in step S34, the connection switch 51 is opened.

In subsequent step S36, a fourth control is performed in which switching control of the switches 32 and 34 is performed so that power is supplied from the second power storage unit 22 to the converter 50, and the auxiliary device driving process ends.

The third control and the fourth control in the auxiliary device driving process will be described below. In the present modification, the third control corresponds to the "second control", and the fourth control corresponds to the "first control".

In the present modification, the third control is performed so that the current IM toward the intermediate terminal PB flows through the connection path LC to supply power from the first power storage unit 21 to the converter 50. Specifically, switching control of the switches 32 and 34 is performed so that the period in which the upper-arm switch 32 is closed is longer than the period in which the lower-arm switch 34 is closed, while the upper-arm switch 32 and the lower-arm switch 34 are alternately closed. In the present embodiment, the upper-arm switch 32 corresponds to the "specific switch", and the lower-arm switch 34 corresponds to the "non-specific switch".

Figure 8A:
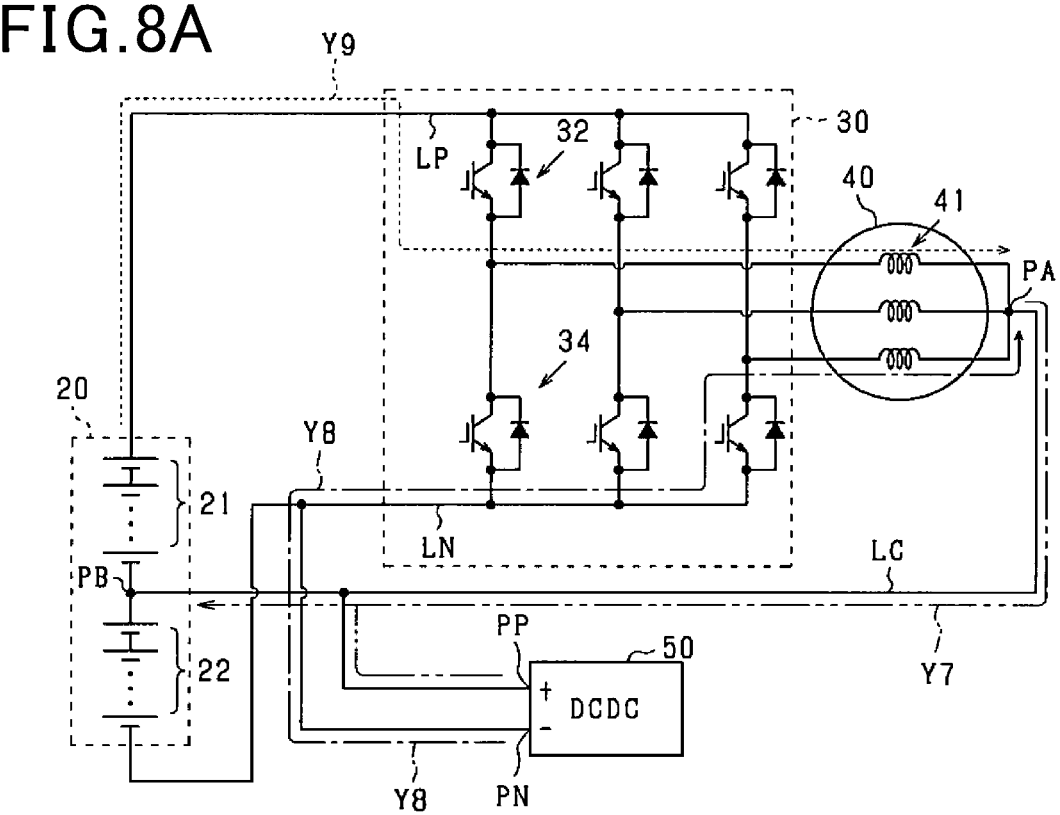
FIG. 8A and FIG. 8B are diagrams showing a current flowing through the power supply system.

As shown in FIG. 8A, when the current IM toward the intermediate terminal PB flows through the connection path LC (see arrow Y7), the voltage can be stepped down in the winding 41. In this case, when the winding 41 is in a step-down state due to switching control of the switches 32 and 34, the voltage on the side of the switches 32 and 34 of the winding 41 is lower than the voltage on the neutral point PA side. That is, the voltage of the negative electrode side electrical path LN connected to the side of the switches 32 and 34 of the winding 41 via the lower-arm switch 34 is lower than the voltage on the negative electrode side of the first power storage unit 21 connected to the neutral point PA via the connection path LC. The voltage of the negative electrode side electrical path LN is input to the low-voltage side input terminal PN of the converter 50, and the voltage on the positive electrode side of the first power storage unit 21 is input to the high-voltage side input terminal PP of the converter 50. Thus, power is supplied from the first power storage unit 21 to the converter 50 (see arrow Y8). Furthermore, part of the current IM flowing to the intermediate terminal PB flows from the positive electrode of the first power storage unit 21 via the upper-arm switch 32 (see arrow Y9). That is, when the current flows back between the first power storage unit 21 and the winding 41 (see arrows Y7 and Y9), power is supplied from the first power storage unit 21 to the converter 50 (see arrow Y8).

Figure 8B:
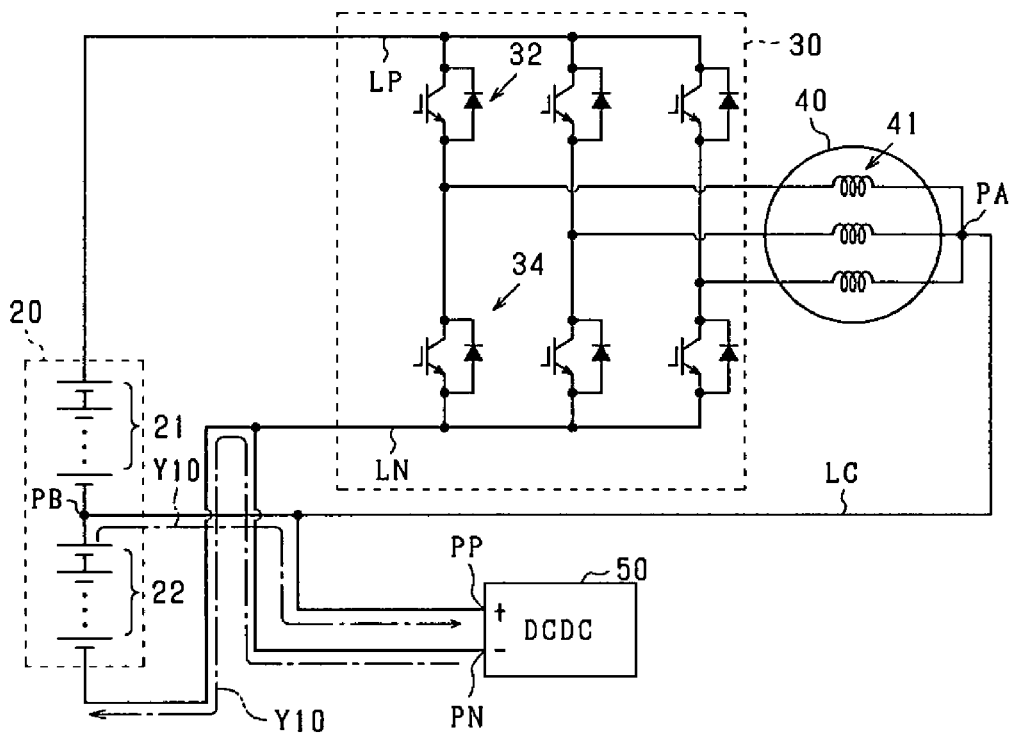

The fourth control is performed so that no current IM flows through the connection path LC to supply power from the second power storage unit 22 to the converter 50. Specifically, as shown in FIG. 8B, when no current IM flows through the connection path LC, the voltage cannot be stepped up or stepped down in the winding 41, and no power is supplied from the first power storage unit 21 to the converter 50 even when the intermediate terminal PB is connected to the neutral point PA via the connection path LC. Thus, power is directly supplied from the second power storage unit 22 to the converter 50 via the negative electrode side electrical path LN and the connection path LC (see arrow Y10).

In the present modification described in detail above, the high-voltage side input terminal PP is connected to the connection path LC, and the low-voltage side input terminal PN is connected to the negative electrode side electrical path LN. In this configuration, power is directly supplied from the second power storage unit 22 to the converter 50 via the connection path LC and the negative electrode side electrical path LN. Furthermore, the negative electrode side of the first power storage unit 21 is connected to the neutral point PA of the winding 41, and switching control of the inverter 30 causes the voltage on the positive electrode side of the first power storage unit 21 to be stepped down in the winding 41 of the rotary electric machine 40, and the stepped-down voltage is used to supply power to the converter 50. In this case, the power of the first power storage unit 21 is supplied to the converter 50.

In both of these power supplies, since the intermediate terminal PB between the first power storage unit 21 and the second power storage unit 22 is connected to the high-voltage side input terminal PP of the converter 50, the connection state between the intermediate terminal PB and the converter 50 does not need to be switched. This eliminates the need for a switch for switching the connection state. This makes it possible to supply power from the power storage units 21 and 22 to the converter 50, while allowing the power supply system 10 to have a simplified configuration.

(Second Modification of First Embodiment)

Figure 9:
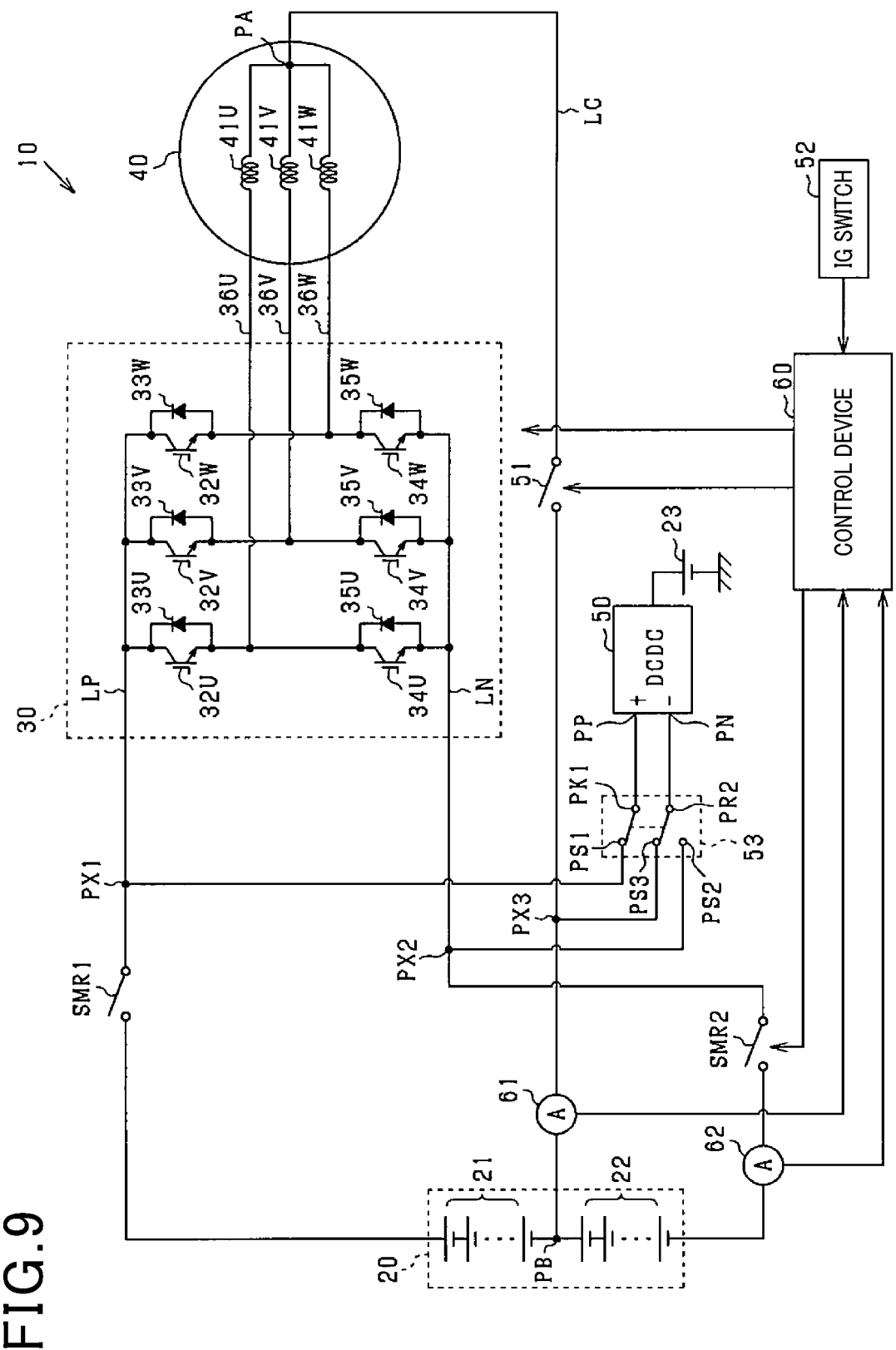
FIG. 9 is a general configuration diagram of a power supply system according to a second modification of the first embodiment.

As shown in FIG. 9, the converter 50 may be configured to be switchable between a state in which the high-voltage side input terminal PP is connected to the positive electrode side electrical path LP and a state in which the high-voltage side input terminal PP is connected to the connection path LC. Furthermore, the converter 50 may be configured to be switchable, in conjunction with the connection state of the high-voltage side input terminal PP, between a state in which the low-voltage side input terminal PN is connected to the connection path LC and a state in which the low-voltage side input terminal PN is connected to the negative electrode side electrical path LN.

Specifically, the power supply system 10 includes a changeover switch 53. The changeover switch 53 is a double switch that includes a first reference terminal PK1, a second reference terminal PK2, and a first connection terminal PS1 to a third connection terminal PS3 to be connected to the first reference terminal PK1 or the second reference terminal PK2 and in which two of the connection terminals PS1 to PS3 connected to the reference terminals PK1 and PK2 are switched in conjunction with each other. The first reference terminal PK1 is connected to the high-voltage side input terminal PP, and the second reference terminal PK2 is connected to the low-voltage side input terminal PN. The first connection terminal PS1 is connected to the positive electrode side electrical path LP at a first connection point PX1, the second connection terminal PS2 is connected to the negative electrode side electrical path LN at a second connection point PX2, and the third connection terminal PS3 is connected to the connection path LC at a third connection point PX3. The connection state of the changeover switch 53 is controlled by the control device 60. In the present modification, the changeover switch 53 corresponds to a "switching unit".

In the changeover switch 53, when the first reference terminal PK1 is connected to the first connection terminal PS1, the second reference terminal PK2 is connected to the third connection terminal PS3. This causes the power supply system 10 of the present modification to be equivalent to the power supply system 10 of the first embodiment. In this case, the first connection point PX1 corresponds to the high-voltage side connection point PU, and the third connection point PX3 corresponds to the low-voltage side connection point PD.

Furthermore, when the first reference terminal PK1 is connected to the third connection terminal PS3, the second reference terminal PK2 is connected to the second connection terminal PS2. This causes the power supply system 10 of the present modification to be equivalent to the power supply system 10 of the first modification. In this case, the second connection point PX2 corresponds to the low-voltage side connection point PD, and the third connection point PX3 corresponds to the high-voltage side connection point PU.

That is, by switching the connection state of the changeover switch 53, one of the first reference terminal PK1 and the second reference terminal PK2 is connected to the connection path LC. Furthermore, by switching the connection state of the changeover switch 53, the other of the first reference terminal PK1 and the second reference terminal PK2 is switched between a state in which it is connected to the positive electrode side electrical path LP and a state in which it is connected to the negative electrode side electrical path LN. Thus, the power storage unit capable of directly supplying power to the converter 50 is switched between the first power storage unit 21 and the second power storage unit 22.

The present modification described above in detail provides the following effect.

The power storage unit that directly supplies power to the converter 50 may be different in power consumption speed from the power storage unit that supplies power to the converter 50 via the winding 41 of the rotary electric machine 40, resulting in a difference in the remaining capacities of the power storage units. For example, as compared with the power storage unit incapable of directly supplying power to the converter 50, that is, the storage battery that supplies power to the converter 50 via the winding 41 of the rotary electric machine 40, the power storage unit capable of directly supplying power to the converter 50 may be more likely to supply power to the converter 50; thus, the remaining capacity Q1 or Q2 of the power storage unit capable of directly supplying power to the converter 50 may be more likely to be reduced. In this regard, in the present modification, the power storage unit capable of directly supplying power to the converter 50 is switchable between the first power storage unit 21 and the second power storage unit 22. This makes it possible to equalize the remaining capacity Q1 of the power storage unit 21 and the remaining capacity Q2 of the power storage unit 22.

Second Embodiment

A second embodiment will be described below with reference to FIGS. 10 and 11, focusing on differences from the first embodiment.

Figure 10:
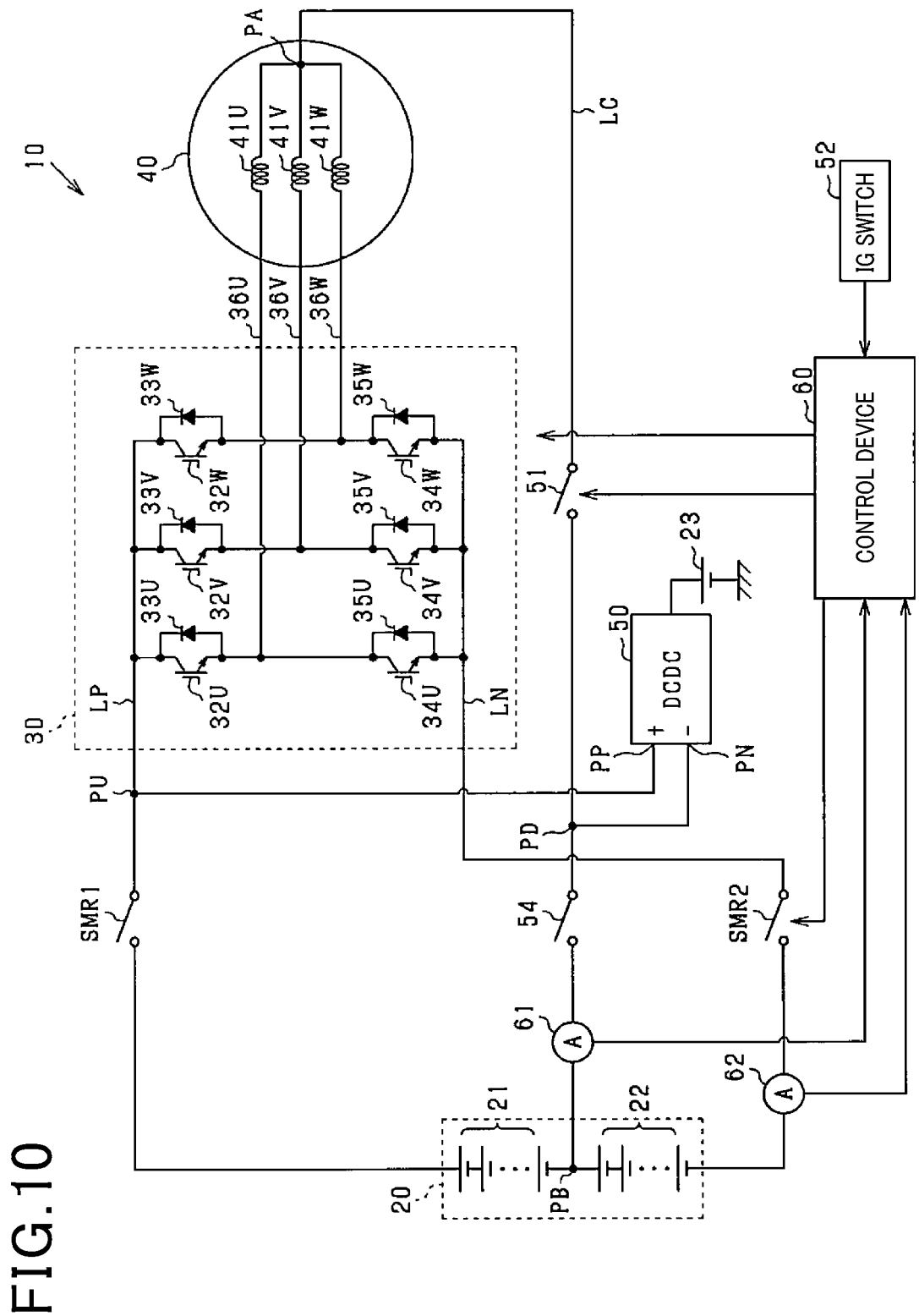
FIG. 10 is a general configuration diagram of a power supply system according to a second embodiment.

As shown in FIG. 10, the present embodiment is different from the first embodiment in that a connection switch 54 is provided at a position in the connection path LC closer to the battery pack 20 than the low-voltage side connection point PD is. Hereinafter, the connection switch 51 is referred to as a first connection switch 51, and the connection switch 54 is referred to as a second connection switch 54 to distinguish between them. The second connection switch 54 is a relay switch, and the control device 60 controls the open/closed state of the second connection switch 54. Thus, the energization between each of the first power storage unit 21 and the second power storage unit 22 and the converter 50 is switched between the energization state and the interruption state. In the present embodiment, the second connection switch 54 corresponds to a "power interruption device".

Furthermore, the present embodiment is different from the first embodiment in that in the auxiliary device driving process, it is determined whether power supply to the converter 50 as the auxiliary device is requested. For example, when an electrical load to which power is supplied from the low-voltage storage battery 23 is not driven, no power supply to the converter 50 is requested. In the present embodiment, when no power supply is requested, in the auxiliary device driving process, the power supply to the converter 50 is stopped while the rotational movement of the rotary electric machine 40 is continued.

Figure 11:
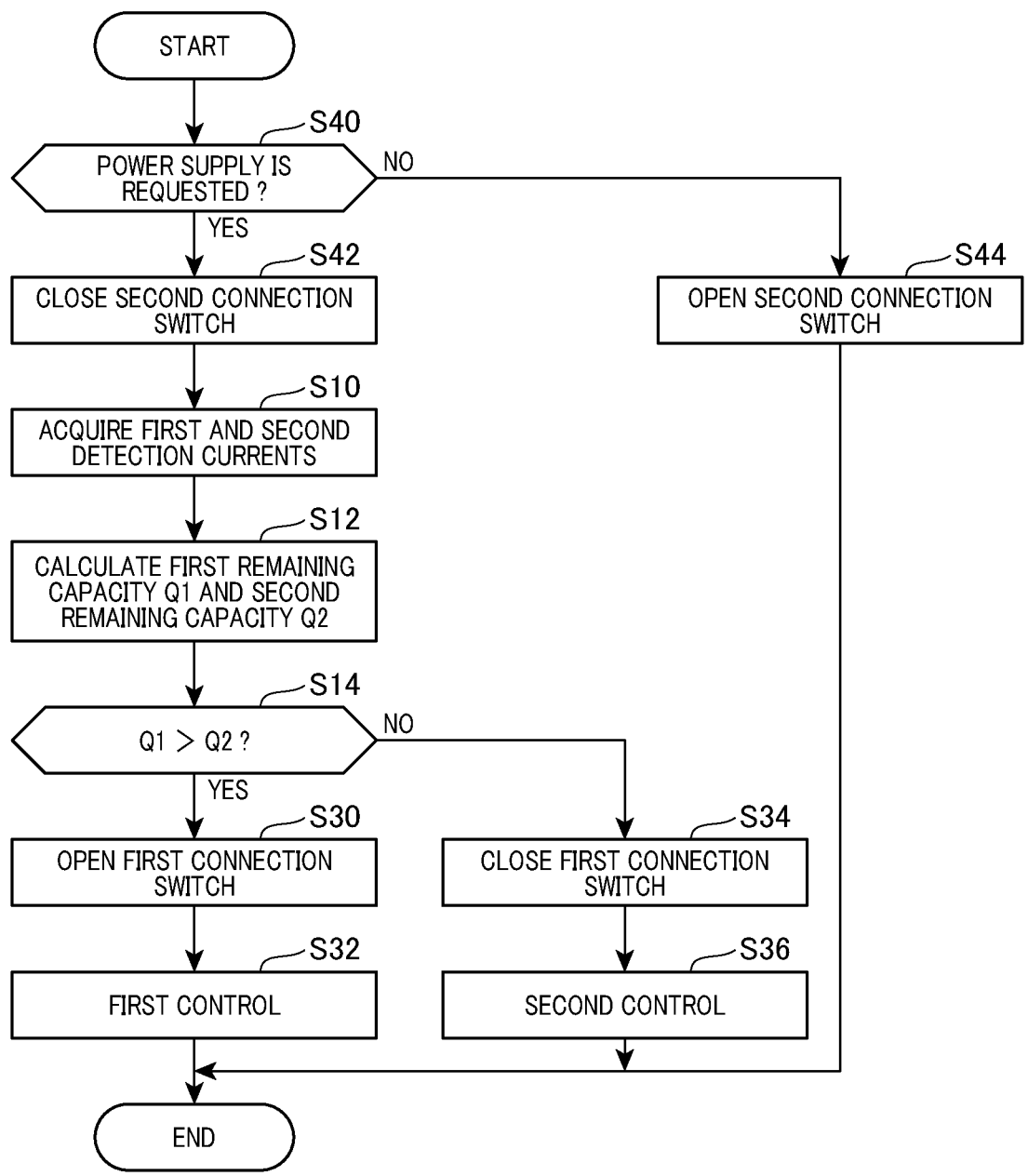
FIG. 11 is a flow chart showing a procedure of the auxiliary device driving process according to the second embodiment.

FIG. 11 shows a flow chart of the auxiliary device driving process of the present embodiment. In FIG. 11, the same steps as the steps shown in FIG. 2 are denoted by the same step numbers and the description thereof is omitted.

In the auxiliary device driving process of the present embodiment, first, in step S40, it is determined whether power supply to the converter 50 is requested. For example, based on a driving state of the electrical load to which power is supplied from the low-voltage storage battery 23, it can be determined whether voltage conversion in the converter 50 is required.

When an affirmative determination is made in step S40, in step S42, the second connection switch 54 is closed, and control proceeds to step S10. On the other hand, when a negative determination is made in step S40, in step S44, the second connection switch 54 is opened, and the auxiliary device driving process ends.

The present embodiment described above in detail provides the following effect.

In the power supply system 10, in some cases, the power supply to the converter 50 is desired to be stopped while the rotational movement of the rotary electric machine 40 is continued. The power supply to the converter 50 can be stopped by opening the first relay switch SMR1; however, when the first relay switch SMR1 is opened, the rotational movement of the rotary electric machine 40 is also stopped. In this regard, in the present embodiment, the second connection switch 54 is provided at a position in the connection path LC closer to the battery pack 20 than the low-voltage side connection point PD is. Thus, by opening the second connection switch 54, the power supply to the converter 50 can be stopped while the rotational movement of the rotary electric machine 40 is continued.

Third Embodiment

A third embodiment will be described below with reference to FIGS. 12 and 13, focusing on differences from the second embodiment.

Figure 12:
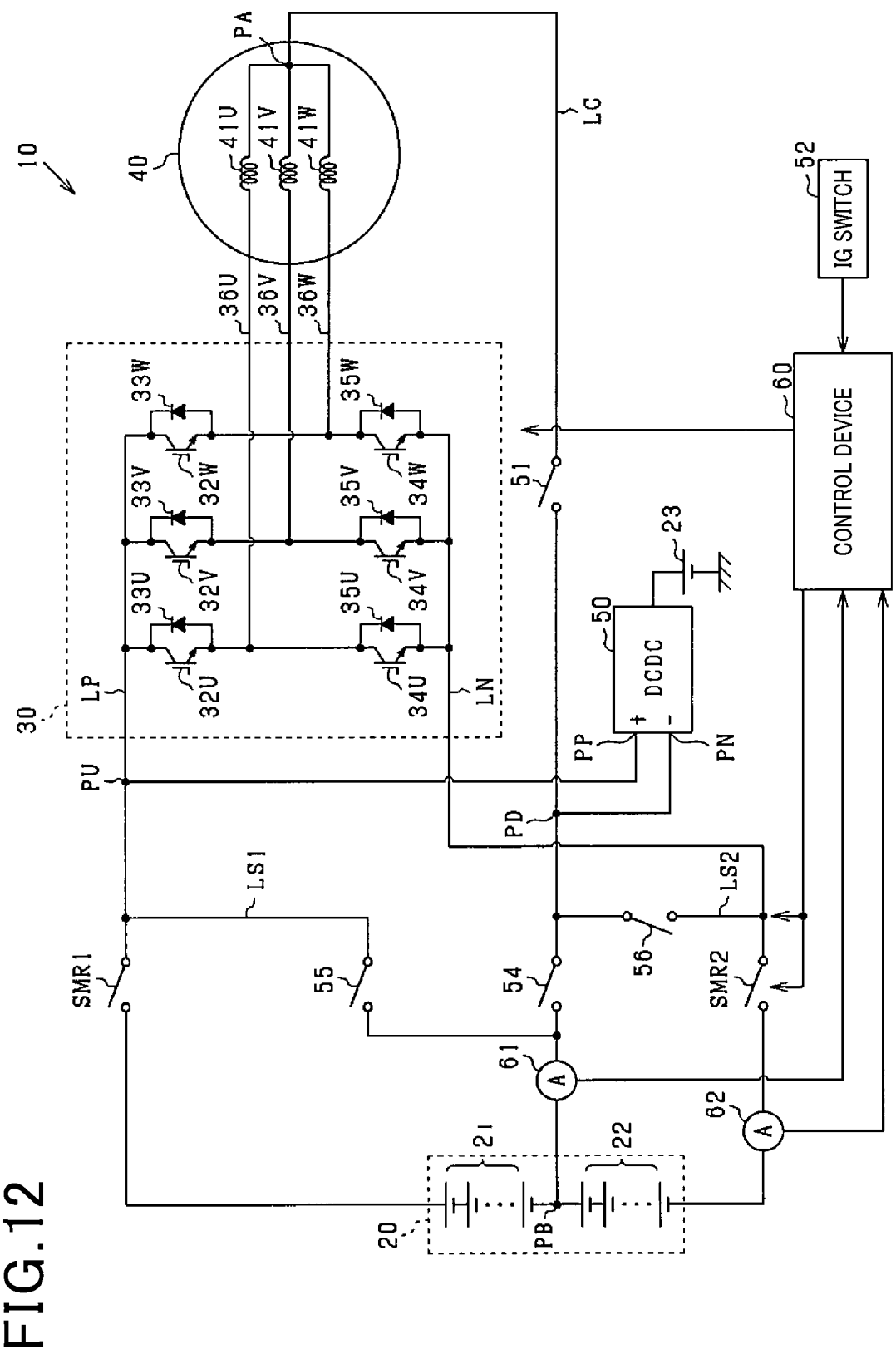
FIG. 12 is a general configuration diagram of a power supply system according to a third embodiment.

As shown in FIG. 12, the present embodiment is different from the second embodiment in that the positive electrode side electrical path LP is connected to the connection path LC by a first intermediate path LS1 and that a third connection switch 55 is provided in the first intermediate path LS1. The first intermediate path LS1 is connected to the positive electrode side electrical path LP at a position closer to the inverter 30 than the first relay switch SMR1 is, and is connected to the connection path LC at a position closer to the battery pack 20 than the second connection switch 54 is.

Furthermore, the present embodiment is different from the second embodiment in that the connection path LC is connected to the negative electrode side electrical path LN by a second intermediate path LS2 and that a fourth connection switch 56 is provided in the second intermediate path LS2. The second intermediate path LS2 is connected to the connection path LC at a position between the first connection switch 51 and the second connection switch 54, and is connected to the negative electrode side electrical path LN at a position closer to the inverter 30 than the second relay switch SMR2 is. The third connection switch 55 and the fourth connection switch 56 are each a relay switch, and the control device 60 controls the open/closed state of the third connection switch 55 and the fourth connection switch 56.

Furthermore, the present embodiment is different from the second embodiment in that in the auxiliary device driving process, it is determined whether an abnormality has occurred in the first power storage unit 21 or the second power storage unit 22. When an abnormality has occurred in the first power storage unit 21 or the second power storage unit 22, the rotational movement of the rotary electric machine 40 is stopped. However, in some cases, the power supply to the converter 50 is desired to be continued in order to notify that the vehicle is stopped due to the stop of the rotational movement. In the present embodiment, in the auxiliary device driving process, the power supply to the converter 50 is continued when an abnormality has occurred in the first power storage unit 21 or the second power storage unit 22.

Figure 13:
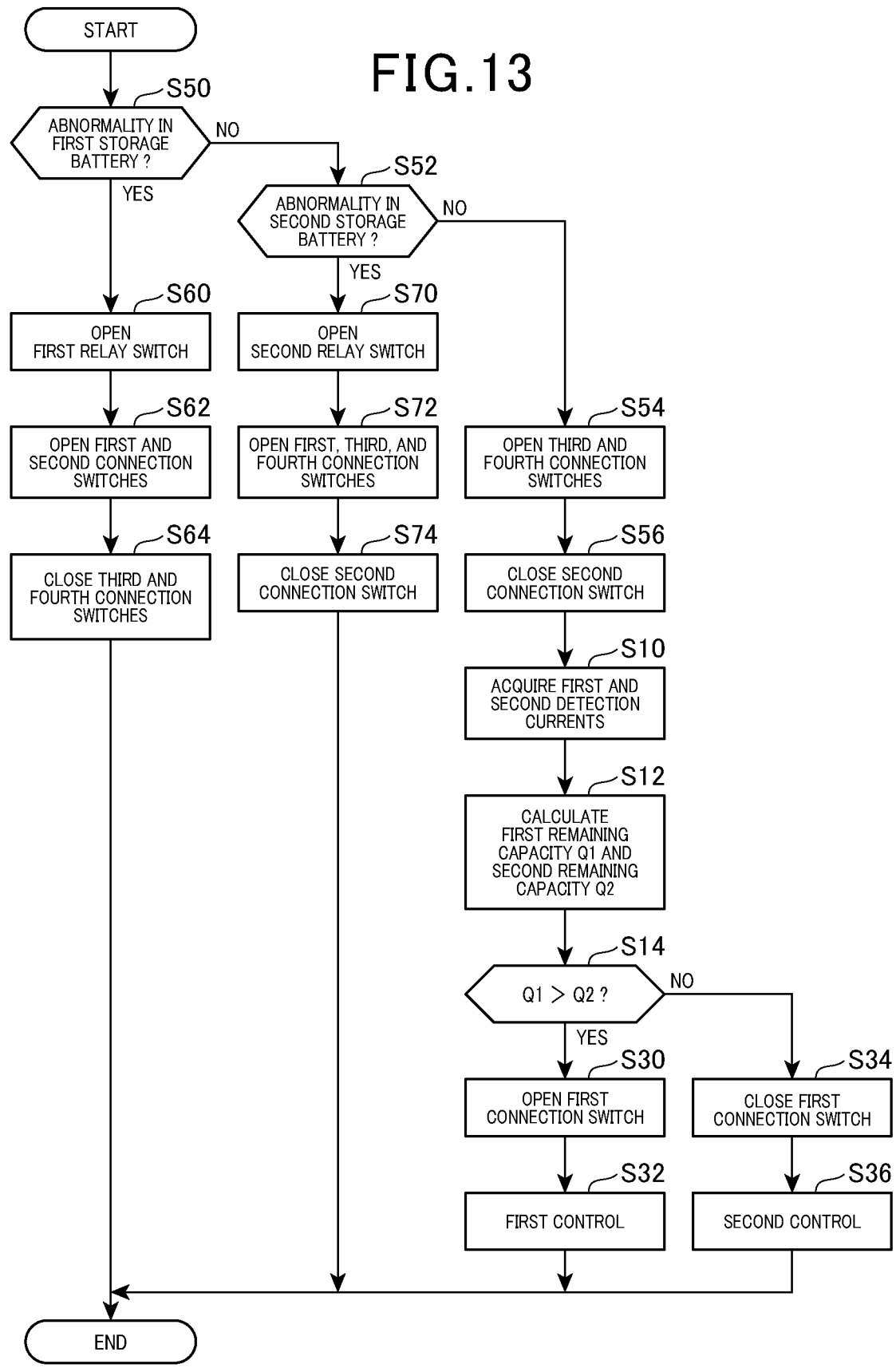
FIG. 13 is a flow chart showing a procedure of the auxiliary device driving process according to the third embodiment.

FIG. 13 shows a flow chart of the auxiliary device driving process of the present embodiment. In FIG. 13, the same steps as the steps shown in FIG. 2 are denoted by the same step numbers and the description thereof is omitted.

In the auxiliary device driving process of the present embodiment, first, in steps S50 and S52, it is determined whether an abnormality has occurred in one of the first power storage unit 21 and the second power storage unit 22. Specifically, in step S50, it is determined whether an abnormality has occurred in the first power storage unit 21. When a negative determination is made in step S50, in step S52, it is determined whether an abnormality has occurred in the second power storage unit 22. In the present embodiment, abnormalities of the power storage unit include a state abnormality in which the voltage of the power storage unit is excessively high or low or the temperature of the power storage unit is excessively high or low, a short-circuit abnormality, an input/output abnormality in which the input/output of the power storage unit is excessively limited, an abnormality of a sensor for detecting a state of the power storage unit, an output abnormality on the sensor side, and an energization path abnormality such as disconnection of the energization path.

When it is determined that no abnormality has occurred in either of the power storage units 21 and 22, a negative determination is made in step S52. In this case, in step S54, the third connection switch 55 and the fourth connection switch 56 are opened. In subsequent step S56, the second connection switch 54 is closed, and control proceeds to step S10.

On the other hand, when it is determined that an abnormality has occurred in one of the power storage units 21 and 22, a process is performed in which the power supply from the power storage unit in which an abnormality has occurred is stopped and the power supply to the converter 50 from the power storage unit in which no abnormality has occurred is continued.

Specifically, when an affirmative determination is made in step S50, first, in step S60, the first relay switch SMR1 is opened. In subsequent step S62, the first connection switch 51 and the second connection switch 54 are opened. In subsequent step S64, the third connection switch 55 and the fourth connection switch 56 are closed, and the auxiliary device driving process ends. Thus, power is supplied from the second power storage unit 22 to the converter 50 via the third connection switch 55, the fourth connection switch 56, and the second relay switch SMR2.

When an affirmative determination is made in step S52, first, in step S70, the second relay switch SMR2 is opened. In subsequent step S72, the first connection switch 51, the third connection switch 55, and the fourth connection switch 56 are opened. In subsequent step S64, the second connection switch 54 is closed, and the auxiliary device driving process ends. Thus, power is supplied from the first power storage unit 21 to the converter 50 via the first relay switch SMR1 and the second connection switch 54.

The present embodiment described above in detail provides the following effect.

In the power supply system 10, in some cases, the power supply to the converter 50 is desired to be continued even when an abnormality has occurred in one of the power storage units 21 and 22. In this regard, in the present embodiment, the positive electrode side electrical path LP is connected to the connection path LC by the first intermediate path LS1, and the third connection switch 55 is provided in the first intermediate path LS1. Furthermore, the connection path LC is connected to the negative electrode side electrical path LN by the second intermediate path LS2, and the fourth connection switch 56 is provided in the second intermediate path LS2. Thus, the power supply to the converter 50 can be continued by appropriately switching various switches including the third connection switch 55 and the fourth connection switch 56 according to one of the power storage units 21 and 22 in which an abnormality has occurred.

Fourth Embodiment

A fourth embodiment will be described below with reference to FIGS. 14 and 15, focusing on differences from the first embodiment.

Figure 14:
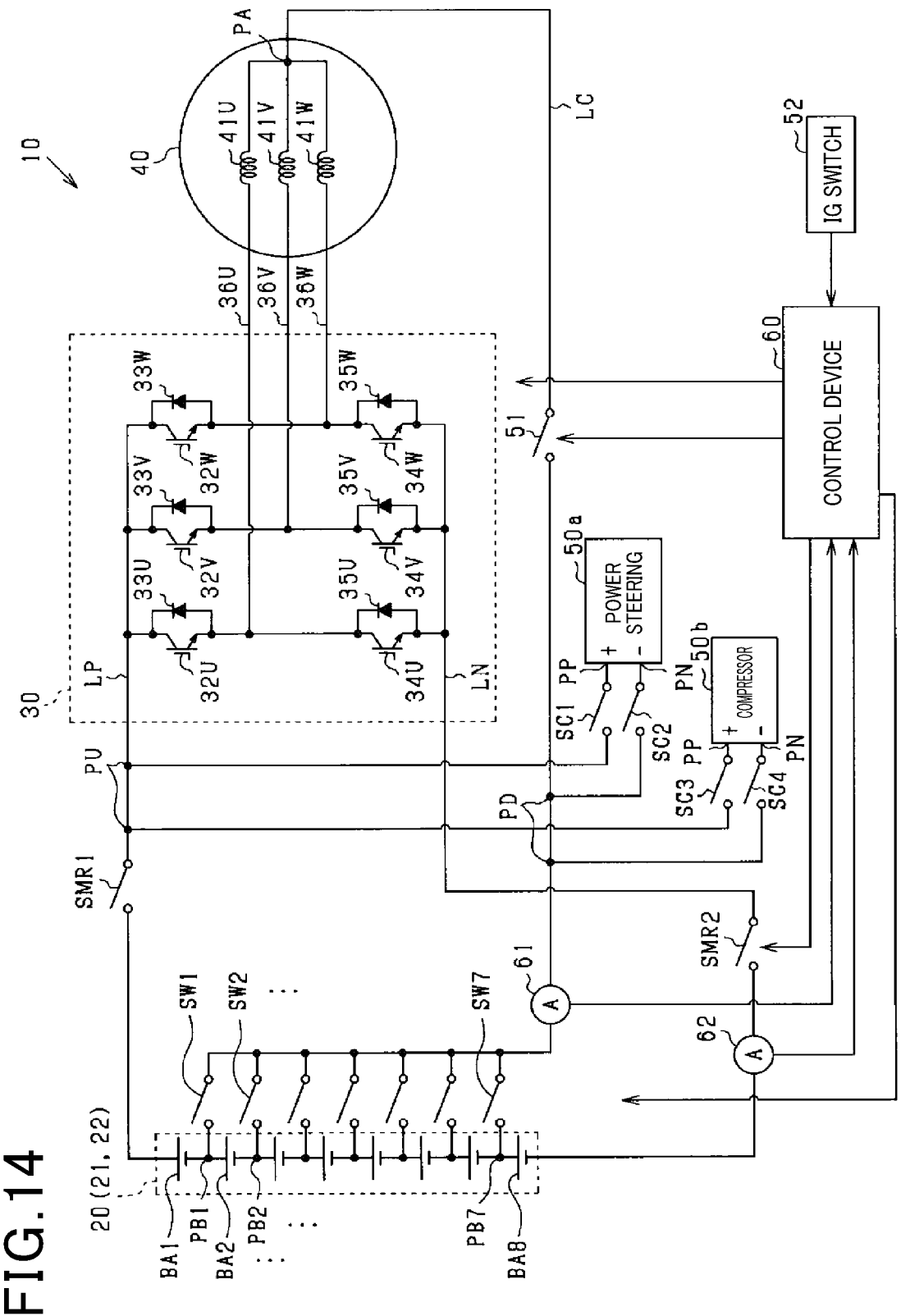
FIG. 14 is a general configuration diagram of a power supply system according to a fourth embodiment.

As shown in FIG. 14, the present embodiment is different from the first embodiment in that the battery pack 20 is constituted by a serial connection in which eight storage batteries BA1 to BA8 are connected in series. Intermediate terminals PB1 to PB7 are provided at intermediate points between storage batteries BA1 to BA8. Specifically, an nth intermediate terminal PBn is provided at an intermediate point between a negative electrode terminal of an nth storage battery BAn (n=1 to 7) and a positive electrode terminal of an (n+1)th storage battery BA(n+1).

The connection path LC is branched for each of the intermediate terminals PB1 to PB7, and selection switches SW1 to SW7 respectively provided for the intermediate terminals PB1 to PB7 allow the neutral point PA to be selectively connectable to one of the intermediate terminals PB1 to PB7. Specifically, when an nth selection switch SWn (n=1 to 7) is closed, the nth intermediate terminal PBn is connected to the neutral point PA. To connect the neutral point PA to one of the intermediate terminals PB1 to PB7, the control device 60 closes one of the selection switches SW1 to SW7 and opens the remaining six selection switches.

In the present embodiment, the first power storage unit 21 is constituted by at least one of the storage batteries BA1 to BA8 located at a position closer to the positive electrode than the intermediate terminal connected to the connection path LC among the intermediate terminals PB1 to PB7 is, and the second power storage unit 22 is constituted by the remaining one or more storage batteries. That is, in the present embodiment, the number of storage batteries included in each of the first power storage unit 21 and the second power storage unit 22 is variable, and this causes the first power storage unit 21 and the second power storage unit 22 to have a variable terminal voltage (output voltage).

Furthermore, the present embodiment is different from the first embodiment in that the power supply system 10 includes, as the auxiliary devices, an electric power steering device 50*a* that controls steering of the vehicle, and an electric compressor 50*b* for air conditioning. The high-voltage side input terminals PP of the electric power steering device 50*a* and the electric compressor 50*b* are each connected to the positive electrode side electrical path LP, and the low-voltage side input terminals PN of the electric power steering device 50*a* and the electric compressor 50*b* are each connected to the connection path LC.

A first adjustment switch SC1 is provided between the high-voltage side input terminal PP of the electric power steering device 50*a* and the positive electrode side electrical path LP. A second adjustment switch SC2 is provided between the low-voltage side input terminal PN of the electric power steering device 50*a* and the connection path LC. A third adjustment switch SC3 is provided between the high-voltage side input terminal PP of the electric compressor 50*b* and the positive electrode side electrical path LP. A fourth adjustment switch SC4 is provided between the low-voltage side input terminal PN of the electric compressor 50*b* and the connection path LC. To supply power to the electric power steering device 50*a*, the control device 60 closes the first adjustment switch SC1 and the second adjustment switch SC2, and opens the third adjustment switch SC3 and the fourth adjustment switch SC4. To supply power to the electric compressor 50*b*, the control device 60 opens the first adjustment switch SC1 and the second adjustment switch SC2, and closes the third adjustment switch SC3 and the fourth adjustment switch SC4.

The electric compressor 50*b* has a driving voltage different from that of the electric power steering device 50*a*. In the present embodiment, the electric compressor 50*b* has a driving voltage higher than that of the electric power steering device 50*a*. Thus, for example, when the terminal voltage of the first power storage unit 21 is set to correspond to the driving voltage of the electric compressor 50*b* and to be higher than the driving voltage of the electric power steering device 50*a*, to supply power from the first power storage unit 21 to the electric power steering device 50*a*, the terminal voltage of the first power storage unit 21 needs to be converted. In the present embodiment, the intermediate terminal connected to the connection path LC among the intermediate terminals PB1 to PB7 is switched according to the driving voltage of the auxiliary device. This eliminates the need for the power supply system 10 to include a converter separately from the inverter 30 and the rotary electric machine 40.

Figure 15:
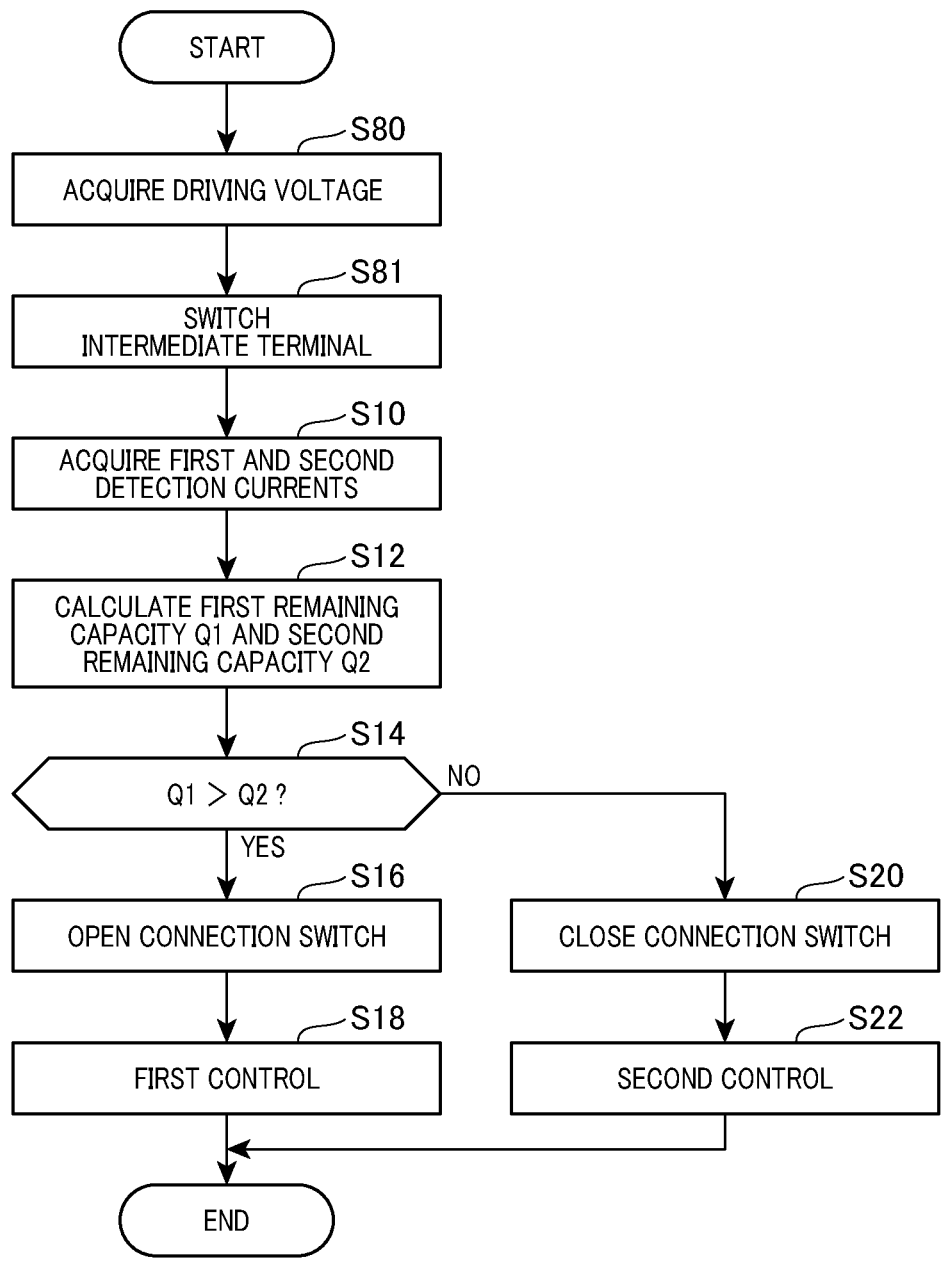
FIG. 15 is a flow chart showing a procedure of the auxiliary device driving process according to the fourth embodiment.

FIG. 15 shows a flow chart of the auxiliary device driving process of the present embodiment. In FIG. 15, the same steps as the steps shown in FIG. 2 are denoted by the same step numbers and the description thereof is omitted.

In the auxiliary device driving process of the present embodiment, first, in step S80, the driving voltage of the power supply destination is acquired, and control proceeds to step S81. For example, from information on one of the auxiliary devices to which power is to be supplied, the driving voltage of the one of the auxiliary devices can be acquired.

In step S81, one of the intermediate terminals PB1 to PB7 connected to the connection path LC is switched according to the driving voltage acquired in step S80, and control proceeds to step S10. In the present embodiment, by switching the intermediate terminal connected to the connection path LC among the intermediate terminals PB1 to PB7, the terminal voltage of the first power storage unit 21 is adjusted to be equal to or substantially equal to the driving voltage of the auxiliary device to which power is to be supplied.

In the second control in step S22, switching control by opening or closing the switches 32 and 34 is switched according to the intermediate terminal connected to the connection path LC among the intermediate terminals PB1 to PB7. Thus, even when the terminal voltage of the second power storage unit 22 is changed according to the intermediate terminal connected to the connection path LC among the intermediate terminals PB1 to PB7, the terminal voltage of the second power storage unit 22 can be converted, using the inverter 30 and the rotary electric machine 40, to a voltage equal to or substantially equal to the driving voltage of the auxiliary device to which power is to be supplied.

The present embodiment described above in detail provides the following effect.

In the power supply system 10, the auxiliary device may have different driving voltages. In this regard, in the present embodiment, the terminal voltage of the first power storage unit 21 is adjusted by switching the intermediate terminal connected to the connection path LC among the intermediate terminals PB1 to PB7 according to the driving voltage of the auxiliary device. This makes it possible to set the terminal voltage of the first power storage unit 21 to be equal to or substantially equal to the driving voltage of the auxiliary device. In this case, the first power storage unit 21 and the second power storage unit 22 may have different inter-terminal voltages; however, the inter-terminal voltage of the second power storage unit 22 can be converted to a voltage equal to the driving voltage of the auxiliary device by controlling the inverter 30.

Fifth Embodiment

A fifth embodiment will be described below with reference to FIG. 16, focusing on differences from the third embodiment.

Figure 16:
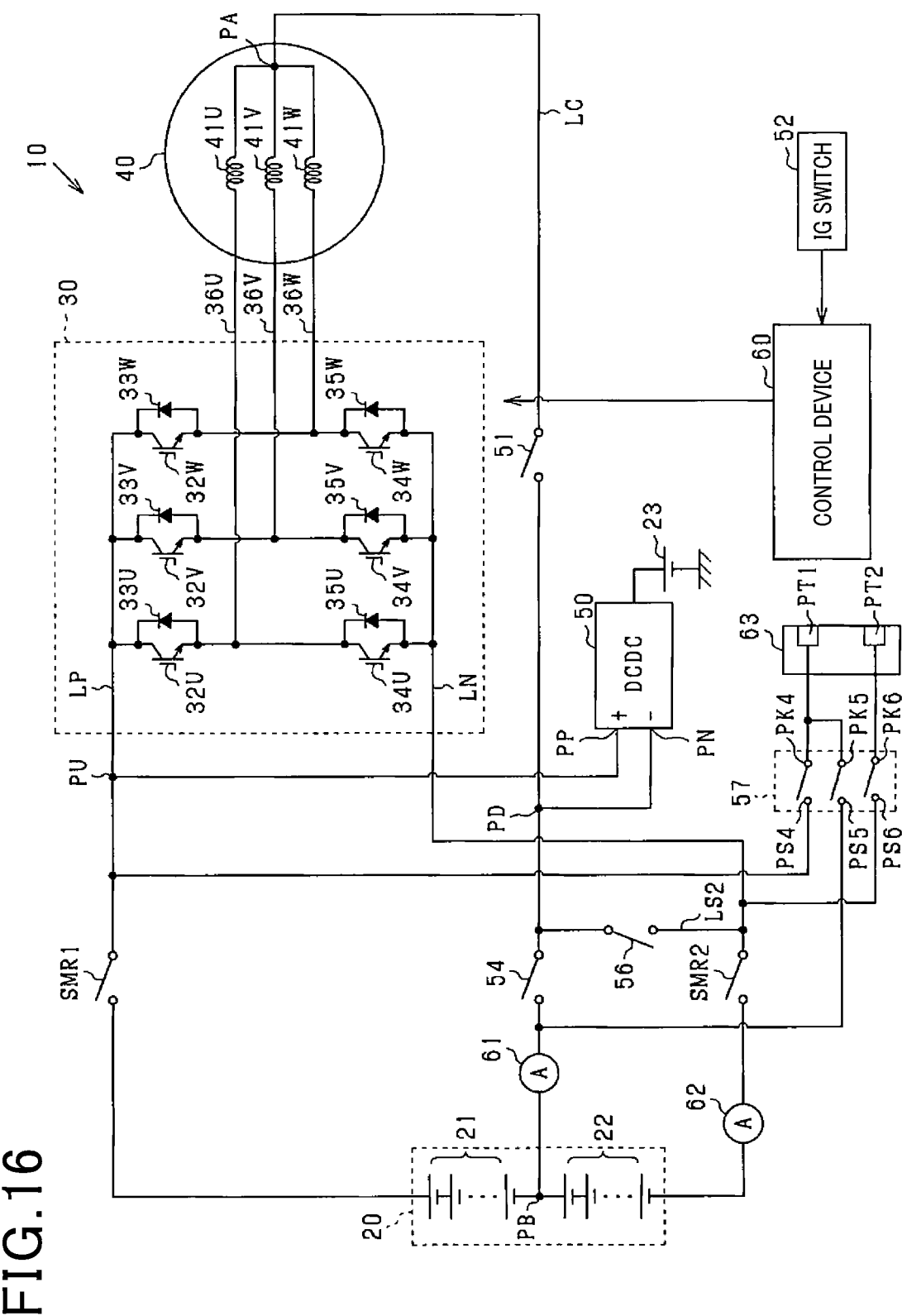
FIG. 16 is a general configuration diagram of a power supply system according to a fifth embodiment.

As shown in FIG. 16, in the power supply system 10, a charging unit 63 which is a charging device such as a charging inlet is connected to a charging apparatus outside the power supply system 10 to charge the first power storage unit 21 and the second power storage unit 22 with charging power input from the charging apparatus. This configuration includes a changeover switch 57 that is provided between the charging unit 63 and the battery pack 20 and switches, according to a charging voltage of the charging apparatus, one of the power storage units 21 and 22 to be charged. The changeover switch 57 is provided to allow the battery pack 20 to be chargeable both when the charging voltage of the charging apparatus is equal to the rated voltage (total voltage) of the battery pack 20, that is, a value obtained by adding the rated voltage of the first power storage unit 21 to the rated voltage of the second power storage unit 22, and when the charging voltage of the charging apparatus is equal to the rated voltage (intermediate voltage) of the second power storage unit 22.

The changeover switch 57 includes a fourth reference terminal PK4 to a sixth reference terminal PK6, and a fourth connection terminal PS4 to a sixth connection terminal PS6 to be respectively connected to the reference terminals PK4 to PK6. The open/closed state of the reference terminal PK4 and the connection terminal PS4, the open/closed state of the reference terminal PK5 and the connection terminal PS5, and the open/closed state of the reference terminal PK6 and the connection terminal PS6 are independently switched. The fourth reference terminal PK4 and the fifth reference terminal PK5 are connected to a first external terminal PT1 which is a high-voltage side input terminal of the charging unit 63, and the sixth reference terminal PK6 is connected to a second external terminal PT2 which is a low-voltage side input terminal of the charging unit 63. The fourth connection terminal PS4 is connected to the positive electrode side electrical path LP at a position closer to the inverter 30 than the first relay switch SMR1 is, the fifth connection terminal PS5 is connected to the connection path LC at a position closer to the battery pack 20 than the second connection switch 54 is, and the sixth connection terminal PS6 is connected to the negative electrode side electrical path LN at a position closer to the inverter 30 than the second relay switch SMR2 is. The connection state of the changeover switch 57 is controlled by the control device 60.

The connection state of the reference terminals PK4 to PK6 is controlled by the control device 60. Specifically, when the charging voltage of the charging apparatus connected to the charging unit 63 is equal to the rated voltage of the battery pack 20, the connection state is controlled so that the fourth reference terminal PK4 is connected to the fourth connection terminal PS4 and the sixth reference terminal PK6 is connected to the sixth connection terminal PS6. The connection state is controlled so that the fifth reference terminal PK5 is not connected to the fifth connection terminal PS5.

When the charging voltage of the charging apparatus connected to the charging unit 63 is equal to the rated voltage of the second power storage unit 22, the connection state is controlled so that the fifth reference terminal PK5 is connected to the fifth connection terminal PS5 and the sixth reference terminal PK6 is connected to the sixth connection terminal PS6. The connection state is controlled so that the fourth reference terminal PK4 is not connected to the fourth connection terminal PS4.

When an abnormality occurs in the first power storage unit 21, the connection state is controlled so that the fourth reference terminal PK4 is connected to the fourth connection terminal PS4 and the fifth reference terminal PK5 is connected to the fifth connection terminal PS5. Thus, the positive electrode side electrical path LP is connected to the connection path LC via the changeover switch 57, and power is supplied from the second power storage unit 22 to the converter 50 via the changeover switch 57.

In the present embodiment described in detail above, the changeover switch 57 can be used as the third connection switch 55, and this eliminates the need for the power supply system 10 to include the third connection switch 55 separately from the changeover switch 57. This allows the power supply system 10 to have a simplified configuration.

Sixth Embodiment

A sixth embodiment will be described below with reference to FIGS. 17 to 19, focusing on differences from the first embodiment.

Figure 17:
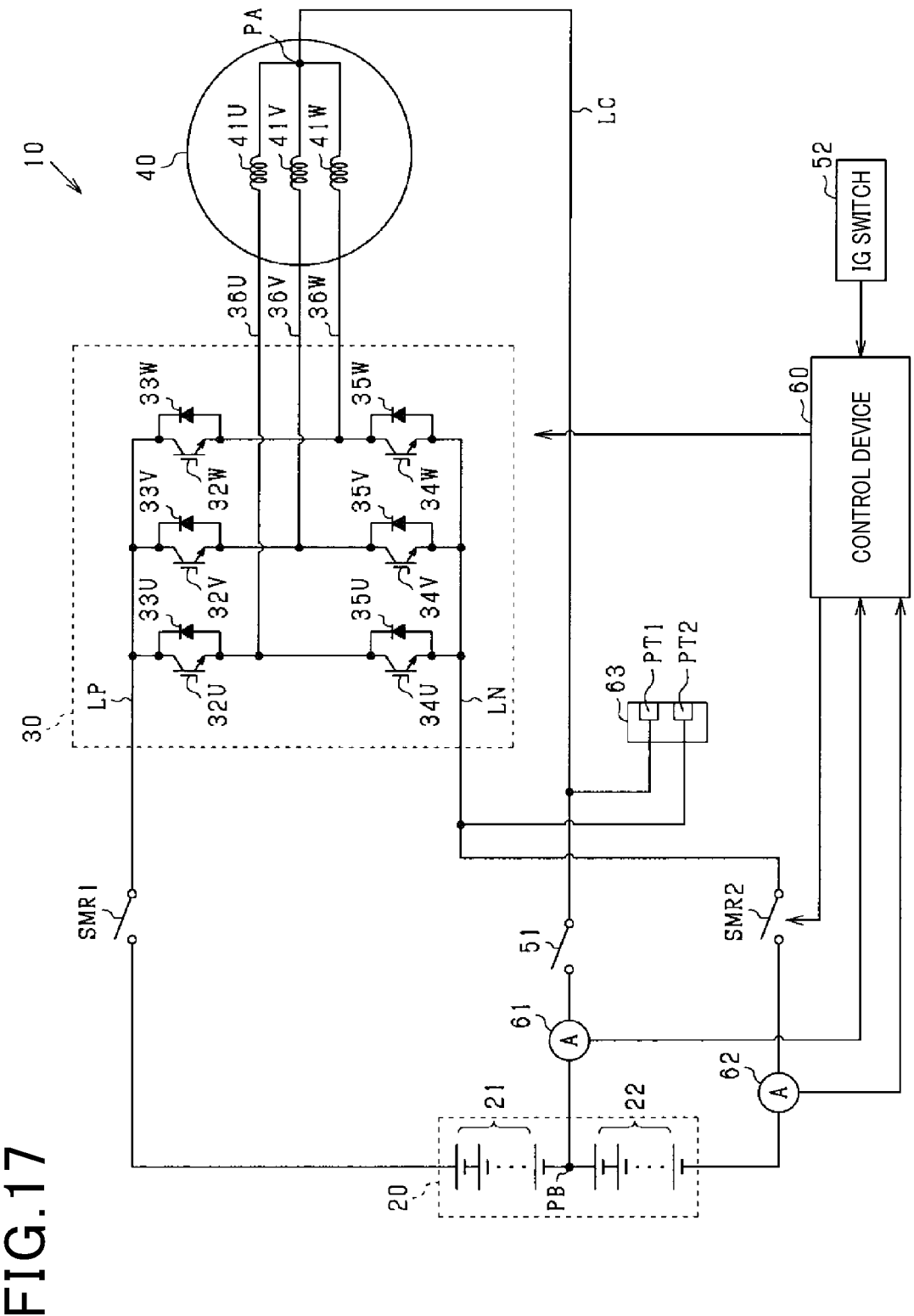
FIG. 17 is a general configuration diagram of a power supply system according to a sixth embodiment.
Figure 18:
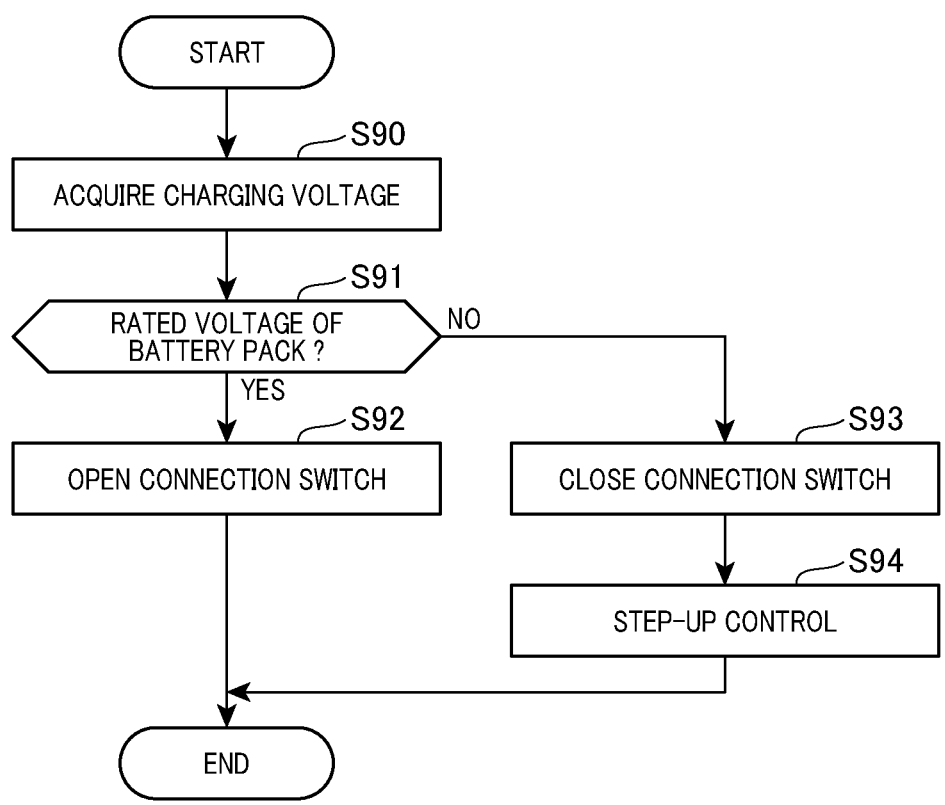
FIG. 18 is a flow chart showing a procedure of a charging process according to the sixth embodiment.

As shown in FIG. 17, the present embodiment is different from the first embodiment in that the power supply system 10 includes the charging unit 63 as the device. The first external terminal PT1 of the charging unit 63 is connected to the connection path LC, and the second external terminal PT2 of the charging unit 63 is connected to the negative electrode side electrical path LN. In the present embodiment, the first connection switch 51 is provided at a position in the connection path LC closer to the intermediate terminal PB than a connection point of the connection path LC and the first external terminal PT1 is.

In the present embodiment, the open/closed state of the first connection switch 51 is switched according to the charging voltage of the charging apparatus connected to the charging unit 63, in order to allow the battery pack 20 to be chargeable both when the charging voltage of the charging apparatus is equal to the rated voltage of the battery pack 20 and when the charging voltage of the charging apparatus is equal to the rated voltage of the second power storage unit 22. FIG. 18 shows a flow chart of a charging process of the present embodiment. The control device 60 performs the charging process when the charging apparatus is connected to the charging unit 63.

When the auxiliary device driving process is started, first, in step S90, the charging voltage of the charging apparatus is acquired, and control proceeds to step S91. The charging voltage of the charging apparatus is acquired, for example, by communication with the charging apparatus that is performed when the charging apparatus is connected to the charging unit 63.

In step S91, it is determined whether the charging voltage acquired in step S90 is a voltage corresponding to the rated voltage of the battery pack 20. In step S91, an affirmative determination is made when the acquired charging voltage is a voltage in a predetermined range in which the middle value is the rated voltage of the battery pack 20, and control proceeds to step S92. On the other hand, a negative determination is made when the acquired charging voltage is a voltage below the predetermined range, that is, an intermediate voltage lower than the voltage corresponding to the rated voltage of the battery pack 20, and control proceeds to step S93.

In step S92, the first connection switch 51 is opened, and the charging process ends.

In step S93, the first connection switch 51 is closed. In subsequent step S94, step-up control is performed in which switching control of the switches 32 and 34 is performed so that the charging voltage of the charging apparatus is stepped up to be equal to or substantially equal to the rated voltage of the battery pack 20, and the charging process ends.

Figure 19A:
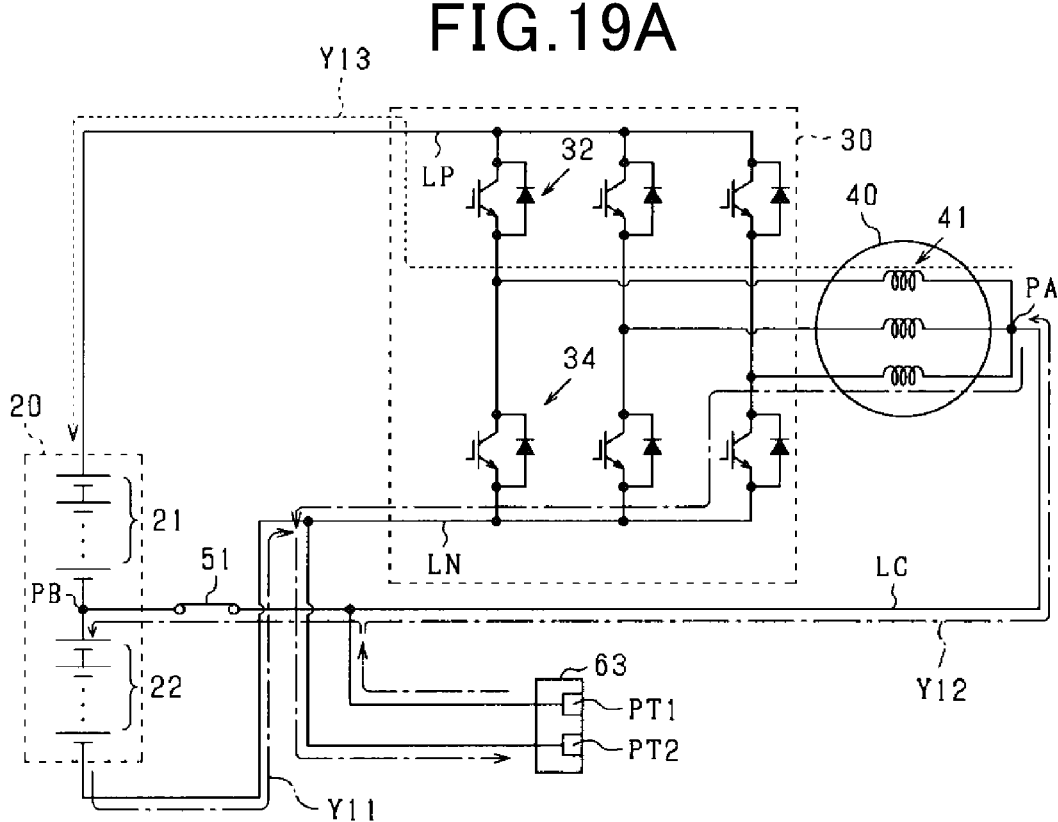
FIG. 19A and FIG. 19B are diagrams showing a current flowing through the power supply system.

A current path when the charging voltage of the charging apparatus is the intermediate voltage of the battery pack 20 and a current path when the charging voltage of the charging apparatus is the rated voltage of the battery pack 20 will be described below. First, the current path when the charging voltage of the charging apparatus is the intermediate voltage will be described with reference to FIG. 19A. In FIG. 19A, the first relay switch SMR1, the second relay switch SMR2, the IG switch 52, the first current sensor 61, the second current sensor 62, and the control device 70 are not shown. The same applies to FIG. 19A.

When the charging voltage of the charging apparatus is the intermediate voltage, the first connection switch 51 is closed. In this case, the charging power from the charging unit 63 is supplied to the second power storage unit 22 via the connection path LC and the negative electrode side electrical path LN to charge the second power storage unit 22. Furthermore, the voltage on the positive electrode side of the second power storage unit 22 is stepped up by switching control of the switches 32 and 34, and the first power storage unit 21 is charged with the stepped-up voltage.

Specifically, as shown in FIG. 19A, the current IM flowing from the first external terminal PT1 of the charging unit 63 is branched at the connection point of the first external terminal PT1 and the connection path LC, and part of the current IM flows to the second power storage unit 22 (see arrow Y11). Thus, the second power storage unit 22 is charged.

The remaining current of the current IM branched at the connection point of the first external terminal PT1 and the connection path LC flows toward the neutral point PA (see arrow Y11). When the current IM toward the neutral point PA flows through the connection path LC and the first connection switch 51 is closed, the voltage can be stepped up in the winding 41. In this case, when the winding 41 is in a step-up state due to switching control of the switches 32 and 34, the voltage on the positive electrode side of the second power storage unit 22 is stepped up, and the current IM toward the first power storage unit 21 flows through the positive electrode side electrical path LP (see arrow Y13). Thus, the first power storage unit 21 is charged. That is, when the charging voltage of the charging apparatus is the intermediate voltage, by controlling the inverter 30, the first power storage unit 21 is simultaneously charged with charging of the second power storage unit 22.

On the other hand, when the charging voltage of the charging apparatus is a voltage corresponding to the rated voltage of the battery pack 20, the first connection switch 51 is opened. In this case, the charging power from the charging unit 63 is supplied to the battery pack 20 via the connection path LC, the winding 41, and the positive electrode side electrical path LP to charge the battery pack 20.

Figure 19B:
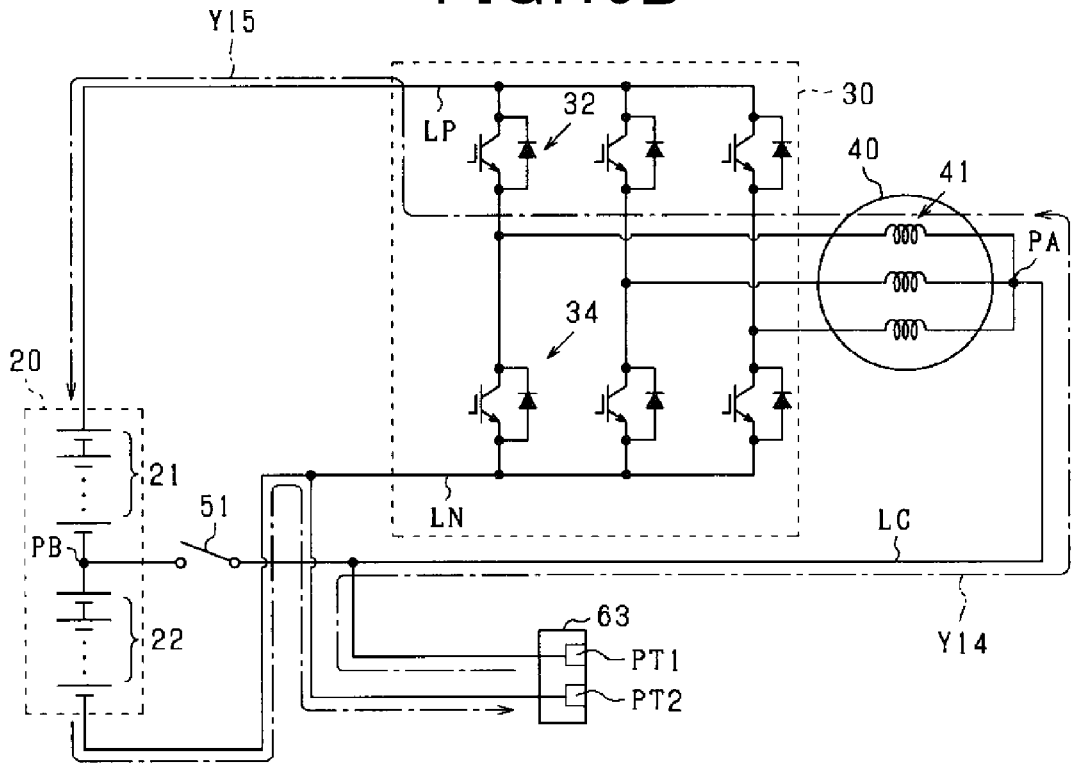

Specifically, as shown in FIG. 19B, the current IM flowing from the first external terminal PT1 of the charging unit 63 is not branched at the connection point of the first external terminal PT1 and the connection path LC, and flows toward the neutral point PA (see arrow Y14). Even when the current IM toward the neutral point PA flows through the connection path LC, in the case where the first connection switch 51 is opened, the voltage cannot be stepped up or stepped down in the winding 41. In this case, the current IM toward the battery pack 20 flows through the winding 41 and the positive electrode side electrical path LP while the voltage on the positive electrode side of the second power storage unit 22 is maintained (see arrow Y15). Thus, the first power storage unit 21 and the second power storage unit 22 are charged. That is, when the charging voltage of the charging apparatus is a voltage corresponding to the rated voltage of the battery pack 20, the inverter 30 is not controlled, and the first power storage unit 21 and the second power storage unit 22 are simultaneously charged.

The present embodiment described above in detail provides the following effects.

In the present embodiment, when the charging voltage of the charging unit 63 is the intermediate voltage lower than the voltage corresponding to the rated voltage of the battery pack 20, the charging power from the charging unit 63 is supplied to the second power storage unit 22 via the connection path LC and the negative electrode side electrical path LN to charge the second power storage unit 22. Furthermore, the voltage on the positive electrode side of the second power storage unit 22 is stepped up by switching control of the switches 32 and 34, and the first power storage unit 21 is charged with the stepped-up voltage. That is, by controlling the inverter 30, the first power storage unit 21 can be simultaneously charged with charging of the second power storage unit 22. This makes it possible to charge the first power storage unit 21 and the second power storage unit 22 without switching the connection state between the battery pack 20 and the charging unit 63, allowing the power supply system 10 to have a simplified configuration.

The charging voltage of the charging unit 63 may not necessarily be the intermediate voltage, and may be a voltage corresponding to the rated voltage of the battery pack 20. When the charging voltage of the charging unit 63 is a voltage corresponding to the rated voltage of the battery pack 20, and the charging voltage of the charging unit 63 is applied to the second power storage unit 22 via the connection path LC and the negative electrode side electrical path LN, a large current flows through the second power storage unit 22, and this may cause the second power storage unit 22 to be overcharged.

In the present embodiment, the first connection switch 51 is provided at a position in the connection path LC closer to the intermediate terminal PB than the connection point of the connection path LC and the first external terminal PT1 of the charging unit 63 is. During charging of the battery pack 20, the first connection switch 51 is opened when the charging voltage of the charging unit 63 is a voltage corresponding to the rated voltage of the battery pack 20, and the first connection switch 51 is closed when the charging voltage of the charging unit 63 is the intermediate voltage lower than the voltage corresponding to the rated voltage of the battery pack 20. This makes it possible to appropriately charge the first power storage unit 21 and the second power storage unit 22 according to the charging voltage of the charging unit 63.

Seventh Embodiment

A seventh embodiment will be described below with reference to FIGS. 20 and 21, focusing on differences from the sixth embodiment.

Figure 20:
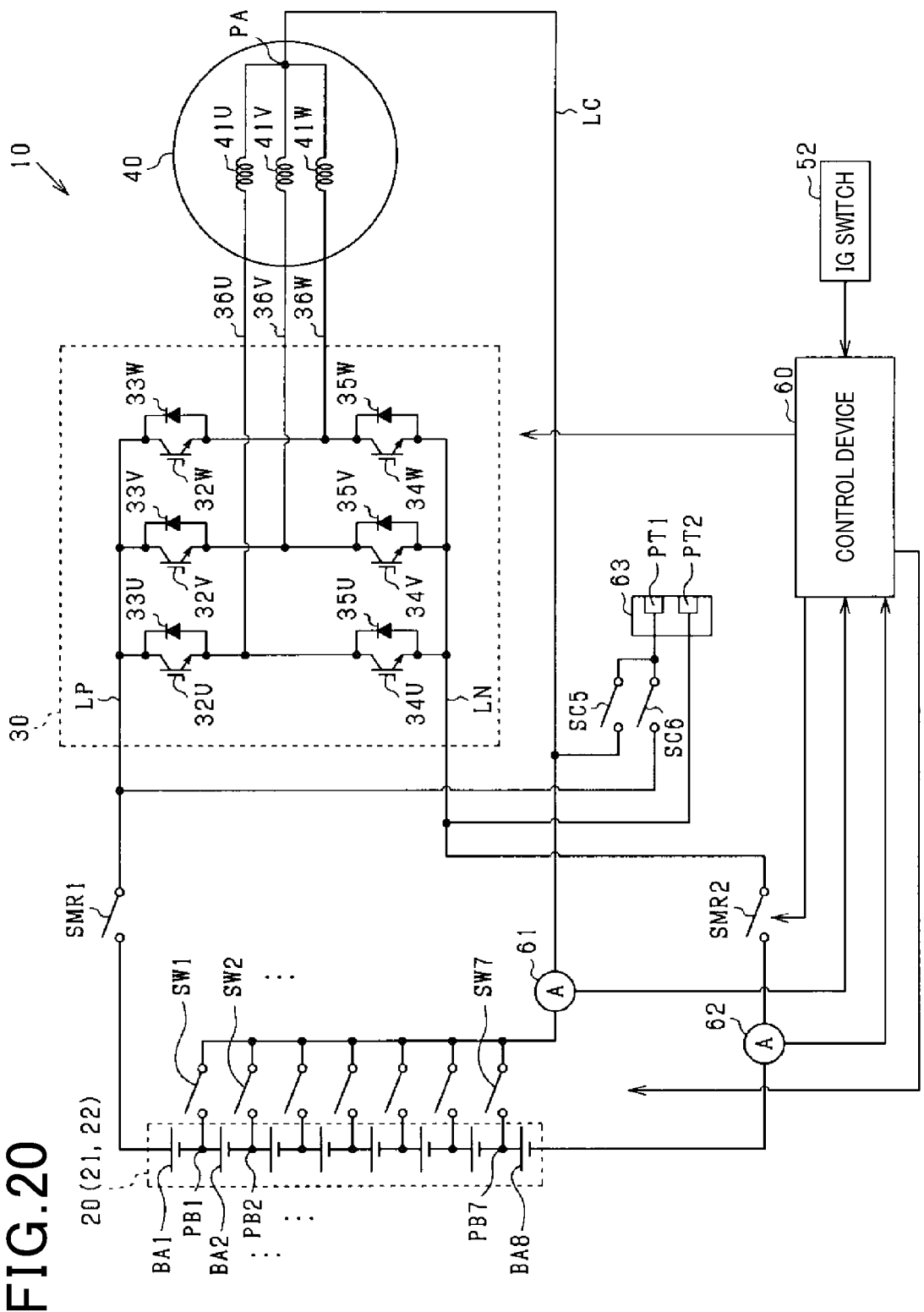
FIG. 20 is a general configuration diagram of a power supply system according to a seventh embodiment.

As shown in FIG. 20, the present embodiment is different from the sixth embodiment in that the battery pack 20 is constituted by a serial connection in which eight storage batteries BA1 to BA8 are connected in series. The configuration of the battery pack 20 and the connection path LC of the present embodiment is the same as the configuration of the battery pack 20 and the connection path LC of the fourth embodiment, and thus will not be described.

Furthermore, the present embodiment is different from the sixth embodiment in that the first external terminal PT1 of the charging unit 63 is to be connected to the connection path LC and the positive electrode side electrical path LP. The charging unit 63 includes adjustment switches SC5 and SC6 to switch one of the connection path LC and the positive electrode side electrical path LP connected to the first external terminal PT1. The fifth adjustment switch SC5 is provided between the first external terminal PT1 of the charging unit 63 and the connection path LC. The sixth adjustment switch SC6 is provided between the first external terminal PT1 of the charging unit 63 and the positive electrode side electrical path LP.

When the control device 60 determines that the charging voltage of the charging unit 63 corresponds to the rated voltage of the battery pack 20, the control device 60 opens the fifth adjustment switch SC5 and closes the sixth adjustment switch SC6. When the control device 60 determines that the charging voltage of the charging unit 63 is the intermediate voltage lower than the voltage corresponding to the rated voltage of the battery pack 20, the control device 60 closes the fifth adjustment switch SC5 and opens the sixth adjustment switch SC6.

When the charging voltage of the charging unit 63 is the intermediate voltage, the intermediate voltage may be different each time. In such a case, when the charging voltage of the charging unit 63 is the intermediate voltage, and the charging voltage of the charging unit 63 is different from the voltage on the positive electrode side of the second power storage unit 22, the charging voltage of the charging unit 63 needs to be converted. In the present embodiment, the intermediate terminal connected to the connection path LC among the intermediate terminals PB1 to PB7 is switched according to the charging voltage of the charging unit 63. This eliminates the need for the power supply system 10 to include a converter separately from the inverter 30 and the rotary electric machine 40.

Figure 21:
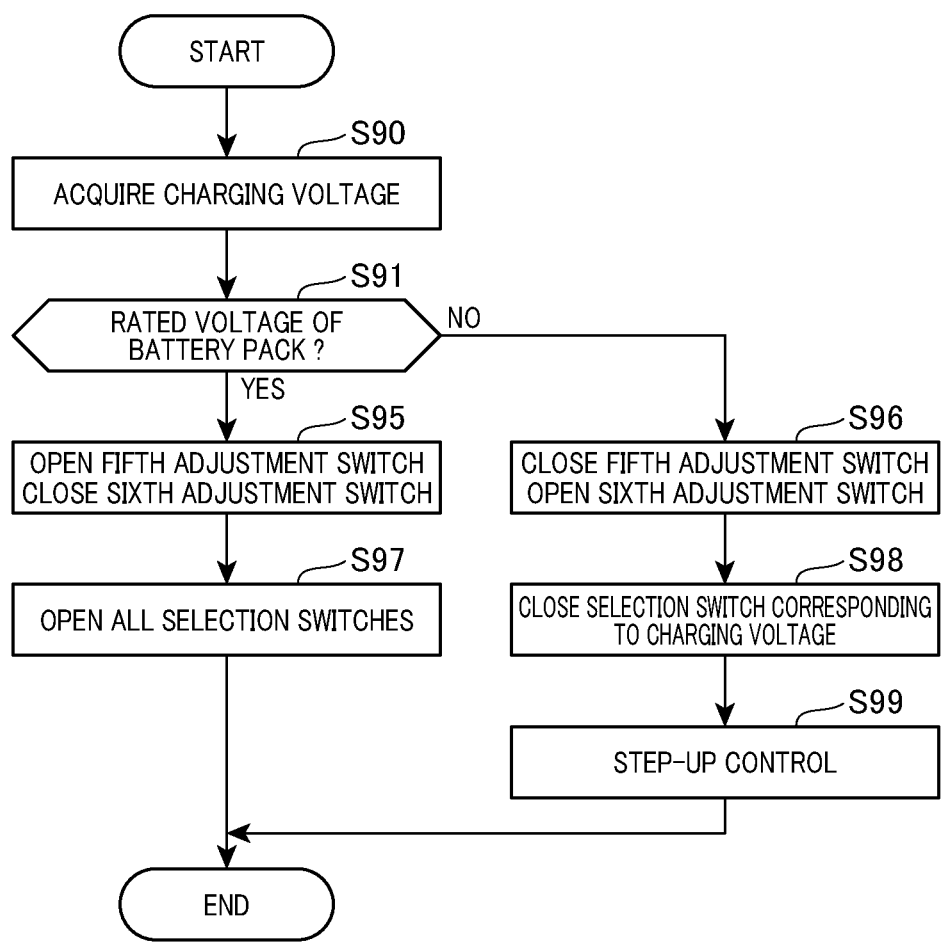
FIG. 21 is a flow chart showing a procedure of the charging process according to the seventh embodiment.

FIG. 21 shows a flow chart of the charging process of the present embodiment. In FIG. 21, the same steps as the steps shown in FIG. 18 are denoted by the same step numbers and the description thereof is omitted.

In the charging process of the present embodiment, when an affirmative determination is made in step S91, control proceeds to step S95. When a negative determination is made in step S91, control proceeds to step S96.

In step S95, the fifth adjustment switch SC5 is opened, and the sixth adjustment switch SC6 is closed. In subsequent step S97, all the selection switches SW1 to SW7 are opened, and the charging process ends.

In step S96, the fifth adjustment switch SC5 is closed, and the sixth adjustment switch SC6 is opened. In subsequent step S98, the intermediate terminal connected to the connection path LC among the intermediate terminals PB1 to PB7 is switched according to the charging voltage acquired in step S90, and control proceeds to step S99. In the present embodiment, the intermediate terminal connected to the connection path LC among the intermediate terminals PB1 to PB7 is switched so that the voltage on the positive electrode side of the second power storage unit 22 is equal to or substantially equal to the charging voltage of the charging unit 63.

In step-up control in step S99, switching control by opening or closing the switches 32 and 34 is switched according to the intermediate terminal connected to the connection path LC among the intermediate terminals PB1 to PB7. Specifically, switching control of the switches 32 and 34 is performed so that a period in which the upper-arm switch 32 is opened is longer than a period in which the lower-arm switch 34 is opened, causing the winding 41 to be in a step-up state. In addition, the period in which the upper-arm switch 32 is opened is set to be longer as the charging voltage acquired in step S90 is lower. Thus, the charging voltage of the charging unit 63 can be stepped up to be equal to or substantially equal to the rated voltage of the battery pack 20 according to the charging voltage of the charging unit 63.

The present embodiment described above in detail provides the following effects.

In the present embodiment, the intermediate terminal connected to the connection path LC among the intermediate terminals PB1 to PB7 is switched according to the charging voltage of the charging unit 63, and the voltage stepped up by switching control of the switches 32 and 34 is changed according to the switching position of the intermediate terminal among the intermediate terminals PB1 to PB7. This enables the voltage on the positive electrode side of the second power storage unit 22 to be equal to or substantially equal to the charging voltage. This eliminates the need for the power supply system 10 to include a component that converts the charging voltage of the charging unit 63, separately from the inverter 30 and the rotary electric machine 40, allowing the power supply system to have a simplified configuration.

In the case where one of the intermediate terminals PB1 to PB7 is electrically connected to the neutral point PA via the connection path LC, the charging voltage is stepped up by adjusting the period in which the upper-arm switch 32 is opened to be longer than the period in which the lower-arm switch 34 is opened. Furthermore, as the upper-arm switch 32 is opened for a longer period, the charging voltage is stepped up by a larger amount. In the present embodiment, the period in which the upper-arm switch 32 is opened is adjusted according to the charging voltage of the charging unit 63 to adjust the amount by which the charging voltage is stepped up. This makes it possible to appropriately charge the first power storage unit using the inverter 30 and the rotary electric machine 40.

OTHER EMBODIMENTS

The above embodiments may be modified and implemented as follows.

The current sensors that detect the charge/discharge currents of the first power storage unit 21 and the second power storage unit 22 may not necessarily be provided at the positions shown in the example in FIG. 1. For example, in FIG. 1, the current sensors only need to be provided in at least two of a first current detection point in the connection path LC closer to the battery pack 20 than the low-voltage side connection point PD is, a second current detection point in the positive electrode side electrical path LP closer to the battery pack 20 than the high-voltage side connection point PU is, and a third current detection point in the negative electrode side electrical path LN.

The first connection switch 51 is not essential. In the first and second embodiments, the second relay switch SMR2 is not essential, and in the first modification of the first embodiment, the first relay switch SMR1 is not essential.

In the second embodiment, the second connection switch 54 may not necessarily be provided at the position shown in the example in FIG. 10. The second connection switch 54 may be provided in a path connecting the high-voltage side input terminal PP to the high-voltage side connection point PU or in a path connecting the low-voltage side input terminal PN to the low-voltage side connection point PD.

The first connection switch 51 and the second connection switch 54 may not necessarily be a relay. The first connection switch 51 and the second connection switch 54 may be, for example, a reversible interruption device such as an N-channel MOSFET or an IGBT.

The third connection switch 55 may not necessarily be a relay. The third connection switch 55 may be, for example, an irreversible interruption device such as a pyro-closer or a fuse. The same applies to the fourth connection switch 56.

The determination of whether the first remaining capacity Q1 is larger than the second remaining capacity Q2 may be performed by determining whether the difference between the first remaining capacity Q1 and the second remaining capacity Q2 is a predetermined value or more, or may be performed by determining whether the ratio between the first remaining capacity Q1 and the second remaining capacity Q2 is a predetermined value or more.

The remaining capacity may be a discharge capacity. The discharge capacity is a current integrated capacity required to reach a predetermined SOC.

The remaining capacity may be the remaining capacity of the battery cell having the largest remaining capacity among the battery cells included in the battery pack 20, or may be the remaining capacity of the battery cell having the smallest remaining capacity among the battery cells included in the battery pack 20. The remaining capacity may be the average remaining capacity of the battery cells included in the battery pack 20.

In the above embodiments, the intermediate terminal PB may be a detachable service plug. In such a case, the intermediate terminal PB is preferably a three-terminal service plug.

The rotary electric machine and the inverter may not necessarily have three phases, and may have five phases, seven phases, or the like.

The upper-arm switch and the lower-arm switch constituting the inverter may not necessarily be an IGBT, and may be, for example, an N-channel MOSFET.

The first power storage unit and the second power storage unit may not necessarily constitute a battery pack.

Figure 22:
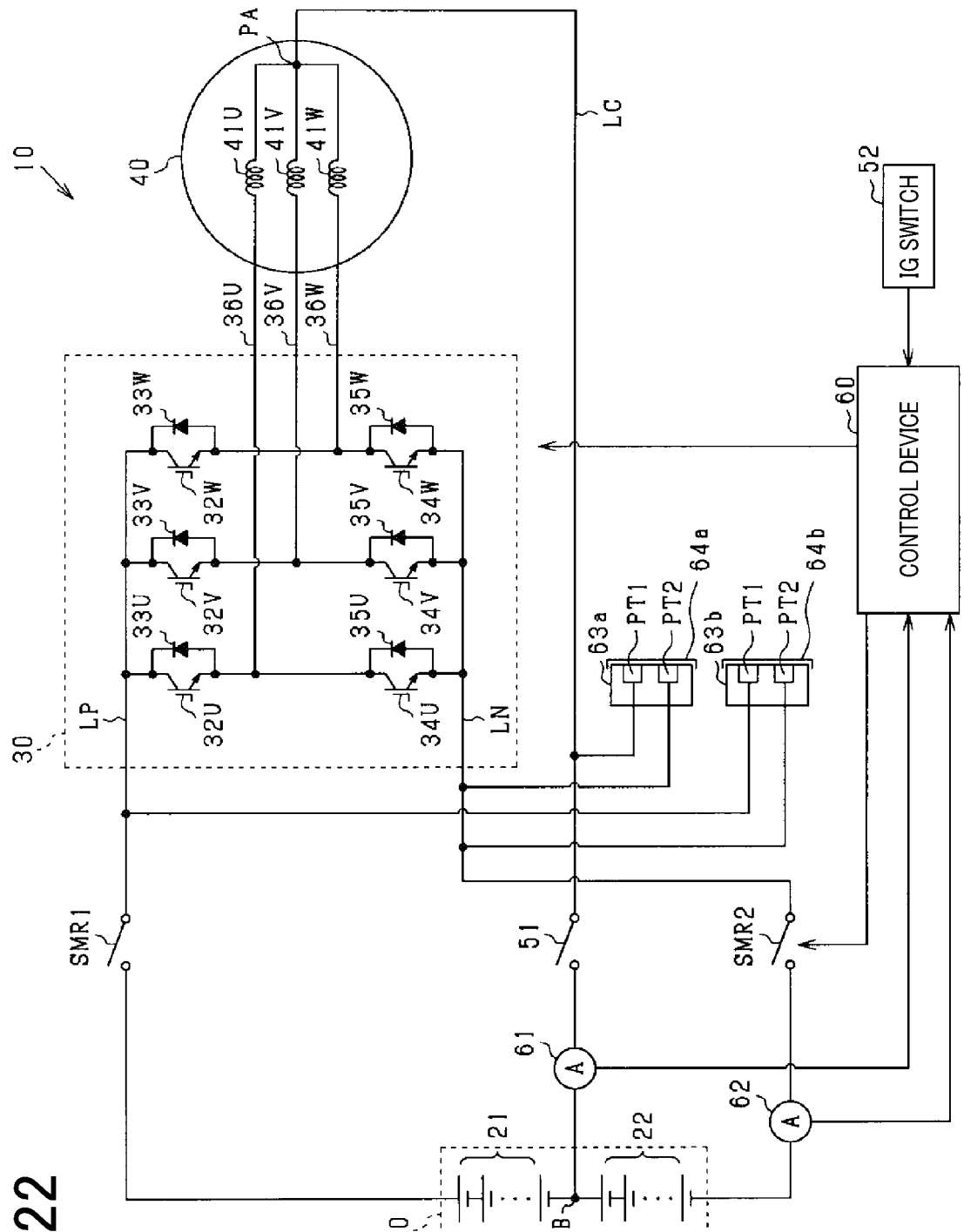
FIG. 22 is a general configuration diagram of a power supply system according to another embodiment.

The charging unit 63 may be provided for each charging voltage of the charging apparatus. In an example shown in FIG. 22, the power supply system 10 includes a first charging unit 63a and a second charging unit 63b. The first external terminal PT1 of the first charging unit 63a is connected to the connection path LC, and the second external terminal PT2 of the first charging unit 63a is connected to the negative electrode side electrical path LN. The first external terminal PT1 of the second charging unit 63b is connected to the connection path LC, and the second external terminal PT2 of the second charging unit 63b is connected to the negative electrode side electrical path LN. In this case, the charging units 63a and 63b may be configured such that covers 64a and 64b are respectively provided for the charging units 63a and 63b and that when one of the covers is opened, the other cover is not opened to ensure safety.

The present disclosure has been described according to the embodiments. However, it is understood that the present disclosure is not limited to the embodiments and structures. The present disclosure includes various modifications and modifications within the equivalent range. In addition, various combinations and forms, as well as other combinations and forms including only one element, more, or less, are within the scope and spirit of the present disclosure.

What is claimed is:
1. A power supply system including a power supply unit composed of a serial connection in which a plurality of storage batteries are connected in series, the power supply system comprising:
an inverter that is connected to the power supply unit via a positive electrode side electrical path and a negative electrode side electrical path and includes a plurality of switching elements;
a rotary electric machine that includes a plurality of windings connected to each other at a neutral point and that inputs and outputs power from and to the power supply unit via the inverter;

a connection path that electrically connects an intermediate point between the storage batteries of the power supply unit to the neutral point of the windings;

a low-voltage storage battery; and a DCDC converter that (i) includes a first terminal and a second terminal that receive power supply from the power supply unit, (ii) converts a terminal voltage of the power supply unit, and (iii) supplies the converted voltage to the low-voltage storage battery, wherein the first terminal of the DCDC converter is connected to the connection path, and the second terminal of the DCDC converter is connected to at least one of the positive electrode side electrical path and the negative electrode side electrical path.

2. The power supply system according to claim 1, comprising a system main relay that is provided in at least one of (i) a position in the positive electrode side electrical path closer to the power supply unit than is a first connection point and (ii) a position in the negative electrode side electrical path closer to the power supply unit than is a second connection point, the first connection point being a point at which the second terminal is connected to the positive electrode side electrical path, and the second connection point being a point at which the second terminal is connected to the negative electrode side electrical path.

3. The power supply system according to claim 1, comprising a control device comprising a microcomputer and configured to perform inverter control by opening or closing the switching elements, wherein the power supply unit includes a first power storage unit on a positive electrode side that is comprised of at least one of the plurality of storage batteries and a second power storage unit on a negative electrode side that is comprised of the remainder of the plurality of storage batteries, the connection path is connected to the intermediate point between the first power storage unit and the second power storage unit, power is supplied to the DCDC converter from the first power storage unit and the second power storage unit, the second terminal is connected to one of the positive electrode side electrical path and the negative electrode side electrical path, one of the first power storage unit and the second power storage unit to which the second terminal is connected via the positive electrode side electrical path or the negative electrode side electrical path is a specific power storage unit, and the other of the first power storage unit and the second power storage unit that is different from the specific power storage unit is a non-specific power storage unit, and the control device is configured to switch the inverter control between a first control in which the inverter control is performed so that no current flows through the connection path in response to supplying power from the specific power storage unit to the DCDC converter and a second control in which the inverter control is performed so that a predetermined current flows through the connection path in response to supplying supply power from the non-specific power storage unit to the DCDC converter.

4. The power supply system according to claim 3, wherein
the inverter includes a serial connection of an upper-arm switch and a lower-arm switch, the control device is configured to, in the first control, cause no current to flow through the connection path by adjusting a period in which the upper-arm switch is closed to be equal to a period in which the lower-arm switch is closed, and the control device is configured to, in the second control, cause a predetermined current to flow through the connection path by adjusting a period in which a specific switch is closed to be longer than a period in which a non-specific switch is closed, the specific switch being one of the upper-arm switch and the lower-arm switch to which the non-specific power storage unit is connected via the positive electrode side electrical path or the negative electrode side electrical path, and the non-specific switch being the other of the upper-arm switch and the lower-arm switch that is different from the specific switch.

5. The power supply system according to claim 3, comprising a plurality of current sensors that detect a current flowing through the first power storage unit and the second power storage unit, wherein the current sensors are provided at at least two of (i) a first current detection point located at a position in the connection path closer to the power supply unit than is a connection point of the connection path and the first terminal, (ii) a second current detection point located at a position in an electrical path between the specific power storage unit and the inverter that is closer to the power supply unit than is a connection point of the electrical path and the second terminal, and (iii) a third current detection point located in an electrical path between the non-specific power storage unit and the inverter, and the control device is configured to switch the inverter control between the first control and the second control based on detection currents detected by the current sensors.

6. The power supply system according to claim 3, wherein
three or more of the storage batteries of the power supply unit are connected in series to have a plurality of the intermediate points between the storage batteries, the connection path is branched for each of the plurality of intermediate points and is selectively connectable to one of the plurality of intermediate points, and the control device is configured to:
acquire information on a driving voltage of the DCDC converter, and adjust an output voltage of the specific power storage unit by switching the one of the plurality of intermediate points connected to the connection path according to the driving voltage.

7. The power supply system according to claim 3, comprising a switching unit configured to switch a connection state of the second terminal between a state in which the second terminal is connected to the positive electrode side electrical path and a state in which the second terminal is connected to the negative electrode side electrical path.

8. The power supply system according to claim 3, comprising a selection interruption device that is provided at a position in the connection path closer to the rotary electric machine than is a connection point of the connection path and the first terminal.

9. The power supply system according to claim 3, comprising a power interruption device that is provided in at least one of (i) a path connecting the first terminal to the connection path, (ii) a path connecting the second terminal to one of the positive electrode side electrical path and the negative electrode side electrical path, and (iii) a position in the connection path closer to the power supply unit than is a connection point of the connection path and the first terminal.

\* \* \* \* \*